US010246946B2

(12) United States Patent
Crisp et al.

(10) Patent No.: US 10,246,946 B2
(45) Date of Patent: Apr. 2, 2019

(54) METHOD AND APPARATUS FOR TRANSPORTING AND STEERING A HEAVY LOAD

(71) Applicant: COLUMBIA TRAILER CO., INC., Hillsboro, OR (US)

(72) Inventors: Ira James Crisp, Portland, OR (US); Steven Andrew Csergei, Hillsboro, OR (US)

(73) Assignee: Columbia Trailer Co., Inc., Hillsboro, OR (US)

( * ) Notice: Subject to any disclaimer, the term of this patent is extended or adjusted under 35 U.S.C. 154(b) by 292 days.

(21) Appl. No.: 15/074,582

(22) Filed: Mar. 18, 2016

(65) Prior Publication Data
US 2016/0280524 A1 Sep. 29, 2016

Related U.S. Application Data

(60) Provisional application No. 62/138,318, filed on Mar. 25, 2015.

(51) Int. Cl.
*B62D 5/28* (2006.01)
*B65G 7/00* (2006.01)
*E21B 15/00* (2006.01)

(52) U.S. Cl.
CPC .............. *E21B 15/003* (2013.01); *B62D 5/28* (2013.01); *B65G 7/00* (2013.01)

(58) Field of Classification Search
CPC .......... B62D 5/28; B62D 55/10; B62D 57/02; B62D 57/022; B62D 57/024; B62D 7/02; B62D 7/16; E21B 15/00; E21B 15/003
See application file for complete search history.

(56) References Cited

U.S. PATENT DOCUMENTS 2,660,253 A * 11/1953 Davidson .................. E02F 9/04
180/8.5
2,919,084 A * 12/1959 Lovell .................... B64C 25/50
244/50

(Continued)

FOREIGN PATENT DOCUMENTS

| CN | 202124072 U | 1/2012 |
| CN | 104204396 A | 12/2014 |
| WO | WO 2013/109147 | 7/2013 |

OTHER PUBLICATIONS

Mobilift TE 95 crane, Paolo de Nicola SpA: Drawings of steering mechanism for model Mobilift TE 95 crane (two pages); Photo of Mobilift Crane (one page); Photo of 95 Metric ton Paolo De Nicola Gantry Crane from http://mediaphotobucket.com/user/Gantrytrader/ (two pages—Visited Apr. 29, 2016).

(Continued)

*Primary Examiner* — Tyrone V Hall, Jr.
(74) *Attorney, Agent, or Firm* — Stoel Rives LLP

(57) ABSTRACT

A method and apparatus for transporting heavy machinery, equipment or other heavy load from one location to another, whereby the apparatus is constructed to steer the load in order to move the load in a desired path to a set position, one embodiment directed to a walking machine including a plurality of lifting assemblies operative to lift the load above the supporting surface and then move or rotate the load relative to the supporting surface by transporting the load via rollers or tracks in the walking machines, the lifting assembly including a steering mechanism using an actuator operative for rotating, via a multi-linkage assembly, whereby the lifting assembly lower structure is rotated relative to the lifting assembly structure to set the walking machine at a desired angle so that lifting assemblies may be driven in a desired walking direction.

24 Claims, 35 Drawing Sheets

(56) References Cited

U.S. PATENT DOCUMENTS

| | | | |
|---|---|---|---|
| 2,943,817 A * | 7/1960 | Hogan | B64C 25/505 244/50 |
| 3,255,836 A | 6/1966 | Hoppmann et al. | |
| 3,335,809 A | 8/1967 | Guinot | |
| 3,576,225 A * | 4/1971 | Chambers | B65G 7/02 180/8.5 |
| 3,680,321 A | 1/1972 | Bordes | |
| 3,769,802 A | 11/1973 | Wefer | |
| 3,792,745 A | 2/1974 | Files | |
| 3,921,739 A | 11/1975 | Rich et al. | |
| 3,938,608 A * | 2/1976 | Folco-Zambelli | A47C 7/006 180/21 |
| 4,029,165 A * | 6/1977 | Miller | B62D 11/20 180/6.48 |
| 4,519,468 A | 5/1985 | Mick | |
| 4,619,340 A * | 10/1986 | Elmer | B60G 17/04 172/413 |
| 4,733,737 A * | 3/1988 | Falamak | B62D 7/026 180/252 |
| 5,492,436 A | 2/1996 | Suksumake | |
| 5,921,336 A * | 7/1999 | Reed | B62D 57/00 180/8.1 |
| 6,106,073 A * | 8/2000 | Simons | E01C 23/088 180/209 |
| 6,173,512 B1 * | 1/2001 | Bitelli | E01C 23/088 299/39.6 |
| 6,186,480 B1 | 2/2001 | Leteurtre | |
| 6,234,061 B1 | 5/2001 | Glasson | |
| 6,234,527 B1 * | 5/2001 | Poulin | B60S 9/21 280/761 |
| 6,240,612 B1 | 6/2001 | Doll | |
| 6,286,615 B1 * | 9/2001 | Bitelli | B62D 7/026 180/411 |
| 6,450,048 B1 | 9/2002 | Samuelson et al. | |
| 6,467,952 B2 | 10/2002 | Dernebo | |
| 6,581,525 B2 | 6/2003 | Smith | |
| 6,581,698 B1 | 6/2003 | Dirks | |
| 6,659,240 B2 | 12/2003 | Dernebo | |
| 6,692,185 B2 | 2/2004 | Colvard | |
| 6,694,861 B2 | 2/2004 | Glasson | |
| 6,702,600 B2 | 3/2004 | Glasson | |
| 6,705,798 B2 * | 3/2004 | Dubay | E01C 19/00 180/209 |
| 6,725,761 B1 | 4/2004 | McNaughton | |
| 6,918,472 B2 | 7/2005 | Dernebo | |
| 7,059,238 B2 | 6/2006 | Albright et al. | |
| 7,120,523 B2 | 10/2006 | Muller | |
| 7,121,185 B2 | 10/2006 | Alrefai | |
| 7,140,693 B2 * | 11/2006 | Dubay | B60G 3/01 299/39.1 |
| 7,182,163 B1 | 2/2007 | Gipson | |
| 7,207,127 B2 | 4/2007 | Rohr | |
| 7,284,472 B1 | 10/2007 | Soellner et al. | |
| 7,290,476 B1 | 11/2007 | Glasson | |
| 7,293,607 B2 | 11/2007 | Lambert et al. | |
| 7,681,674 B1 * | 3/2010 | Barnes | B60P 1/00 180/6.48 |
| 7,806,207 B1 | 10/2010 | Barnes et al. | |
| 7,819,209 B1 | 10/2010 | Bezner | |
| 8,051,930 B1 * | 11/2011 | Barnes | B62D 57/028 180/8.3 |
| 8,100,045 B2 | 1/2012 | Osborn et al. | |
| 8,297,876 B2 * | 10/2012 | Wagner | E01C 23/088 180/209 |
| 8,448,563 B2 | 5/2013 | Wenker et al. | |
| 8,459,898 B2 | 6/2013 | Guntert et al. | |
| 8,490,724 B2 | 7/2013 | Smith et al. | |
| 8,561,733 B2 | 10/2013 | Smith et al. | |
| 8,573,334 B2 | 11/2013 | Smith et al. | |
| 8,829,893 B2 | 9/2014 | Youngner et al. | |
| 9,004,203 B2 | 4/2015 | Smith et al. | |
| 9,045,178 B2 | 6/2015 | Smith et al. | |
| 9,096,282 B2 | 8/2015 | Smith et al. | |
| 9,132,871 B2 | 9/2015 | Crisp et al. | |
| 2002/0077734 A1 | 6/2002 | Muller | |
| 2002/0185319 A1 * | 12/2002 | Smith | B62D 55/00 180/9 |
| 2010/0252395 A1 | 10/2010 | Lehtonen et al. | |
| 2011/0120300 A1 | 5/2011 | Fletcher et al. | |
| 2014/0054097 A1 * | 2/2014 | Bryant | E21F 13/006 180/8.1 |
| 2014/0262562 A1 | 9/2014 | Eldib et al. | |
| 2015/0016887 A1 | 1/2015 | Schmidt et al. | |
| 2015/0053426 A1 * | 2/2015 | Smith | E21B 15/003 166/381 |
| 2015/0114717 A1 | 4/2015 | Fortson et al. | |
| 2015/0166134 A1 | 6/2015 | Trevithick et al. | |

OTHER PUBLICATIONS

"New land rig design targets fast-moving shale drilling", Global Energy Services, Drilling Contractor, Mar. 24, 2010, http://www.drillingcontractor.org/new-land-rig-design-targets-fast-moving-shale-drilling-4769 (Visited Jun. 12, 2015).

"Custom Cylinder Solutions for Land-Based Drilling Rigs", Clover Industries, Dec. 21, 2014, http://www.oilgear.com/defaultfilepile/public/clover/documents/clover_land_based_rig_brochure.pdf (Visited Jun. 12, 2015).

Csergei and Crisp, Method and Apparatus for Transporting and Steering a Heavy Load, U.S. Appl. No. 15/197,430, filed Jun. 29, 2016.

* cited by examiner

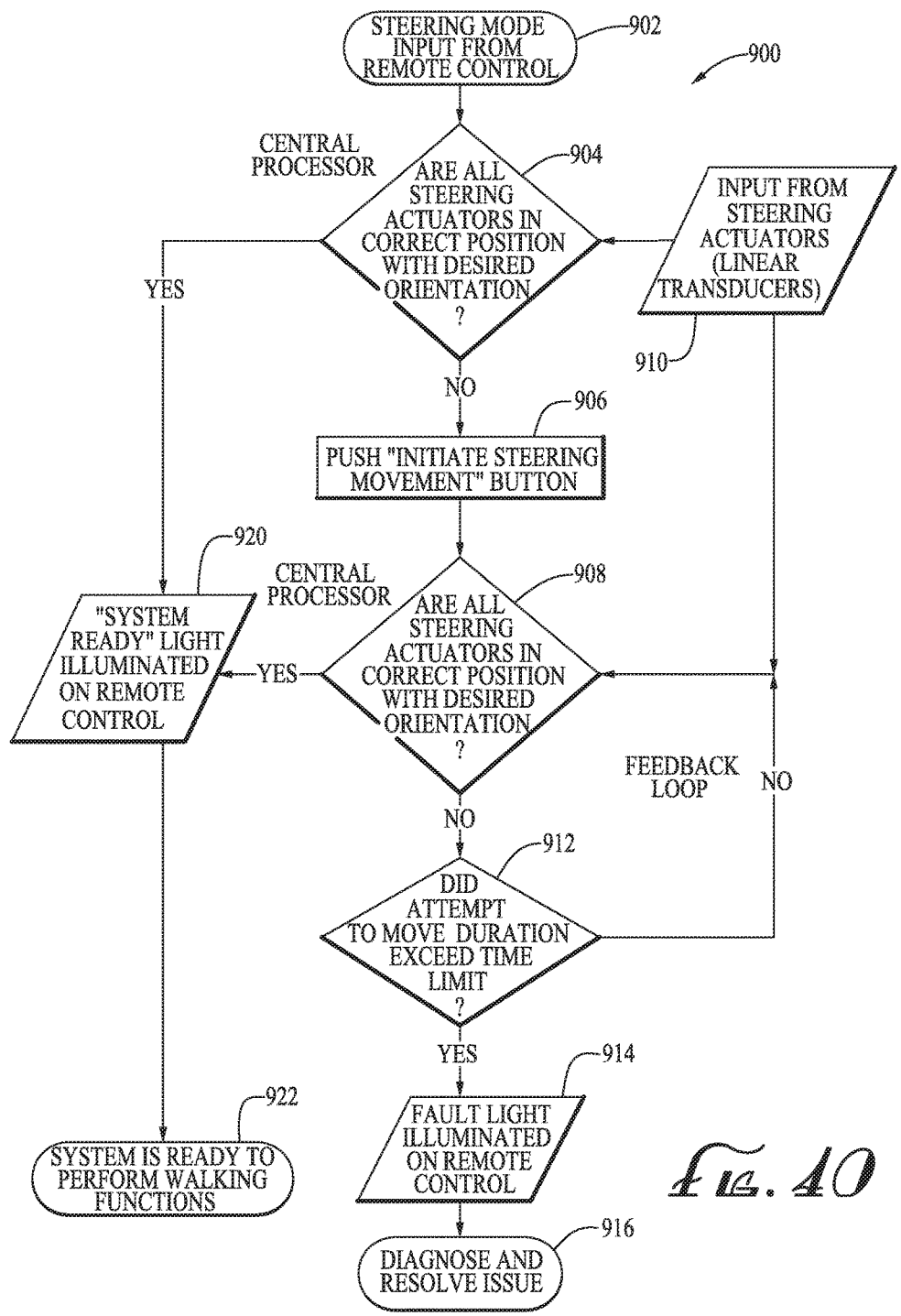

METHOD AND APPARATUS FOR TRANSPORTING AND STEERING A HEAVY LOAD

RELATED APPLICATION DATA

This application claims priority under 35 U.S.C. § 119(e) to U.S. Provisional Application No. 62/138,318 filed on Mar. 25, 2015, hereby incorporated by reference.

BACKGROUND

The field of the present disclosure relates to a class of transportation machines commonly referred to as "walking machines" which are large, typically non-wheeled, power-driven structures operable for transporting massive and heavy loads, upwards of several thousand tons, over a surface such as ground, snow, a prepared gravel area, etc. These machines and the heavy substructures in themselves are fabricated from steel and other high strength materials and find particular use in carrying and sequentially transporting large and huge structures such as oil drilling rigs to position, and re-position, them over a drilling well bore in a new field undergoing exploration for oil, or existing well bores in oil fields previously worked, as needed.

Instead of using wheels to move the heavy loads, these walking machines comprise a plurality of lifting assemblies that typically use hydraulic lift cylinders to lift the load above the supporting surface and then move or rotate the bad relative to the supporting surface by transporting the bad via rollers or tracks in the walking machines.

In order to position the oil rig or other heavy load in a precise position, these walking machines may be provided with a steering mechanism whereby the walking machine unit may be rotated or steered to a desired position. U.S. Pat. No. 6,581,525, hereby incorporated by reference, shows walking machine systems and methods for moving heavy loads, such as oil rig structures. The U.S. Pat. No. 6,581,525 also discloses a steering system for a walking machine in which a substructure of the walking unit may be disengaged and rotated relative to its upper structure thus repositioning the substructure for travel at a desired steered angle. Other steering systems for walking machines are disclosed in U.S. Pat. Nos. 8,573,334 and 7,806,207. These steering systems have various limitations and potentially undesirable characteristics, which may include depending upon the design: only manual repositioning; complicated rotational position detection and control; complicated or unreliable rotational drive mechanisms.

SUMMARY

The present invention is directed to a method and apparatus for transporting heavy machinery, equipment or other heavy load from one location to another, whereby the apparatus is constructed to steer the load in order to move the load in a desired path to a set position. A preferred embodiment is directed to a walking machine comprising a plurality of lifting assemblies operative to lift the load above the supporting surface and then move or rotate the load relative to the supporting surface by transporting the load via rollers or tracks in the walking machines, the lifting assembly including a steering mechanism operative for rotating the lifting assembly lower structure relative to the lifting assembly structure to set the walking machine at a desired angle so that lifting assemblies may be driven in a desired walking direction.

Additional aspects and advantages will be apparent from the following detailed description of preferred embodiments, which proceeds with reference to the accompanying drawings.

BRIEF DESCRIPTION OF THE DRAWINGS

FIG. 36 is a diagram of settings for steering linkages for complementary steering travel mode.

FIG. 40 is a flow chart of a control scheme according to an embodiment.

DETAILED DESCRIPTION OF PREFERRED EMBODIMENTS

Figure 1:
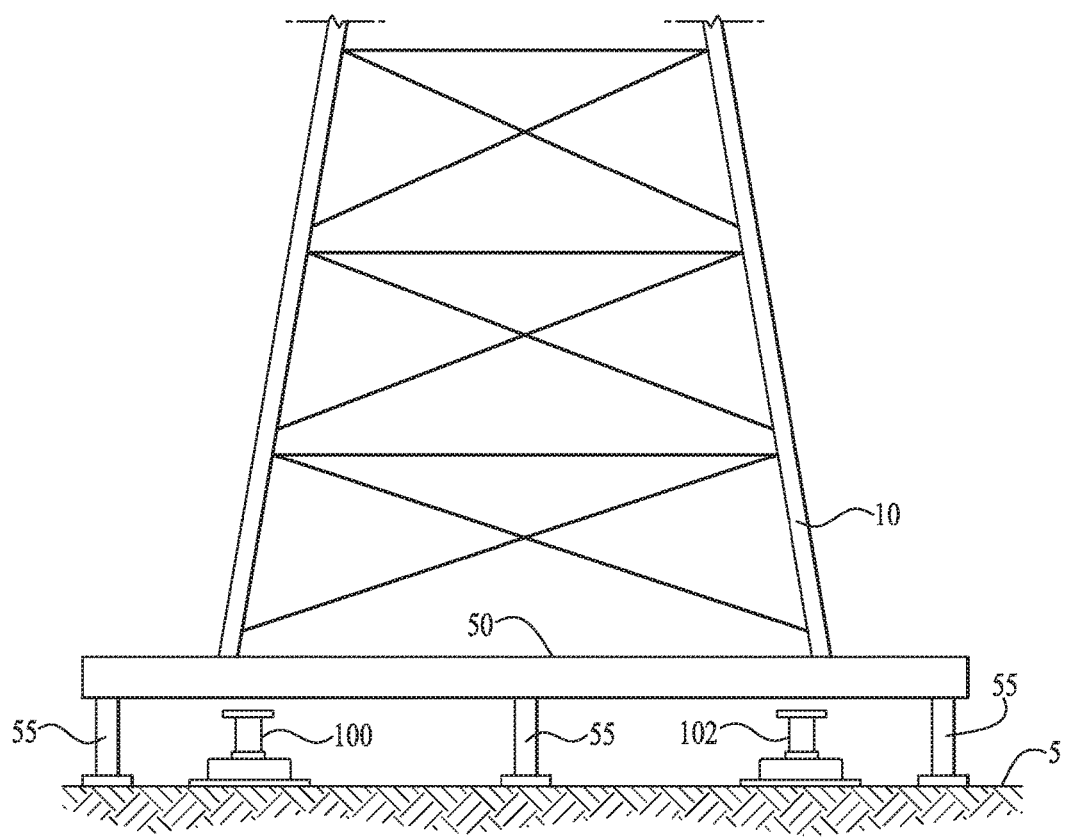
FIG. 1 is a diagrammatic view of an example walking machine system for moving a large support structure shown as an oil rig.
Figure 2:
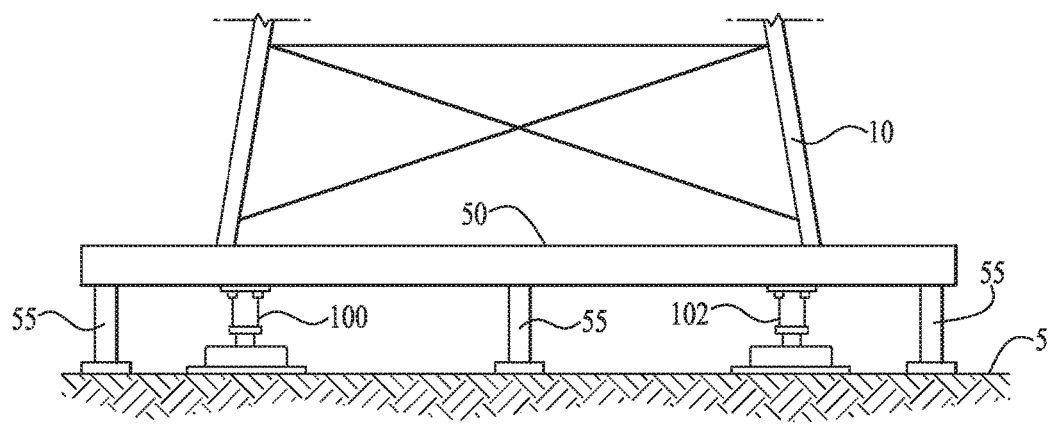
FIG. 2 is a partial view of the walking machine system of FIG. 1 with the walking machine units in position connected to the oil rig.
Figure 3:
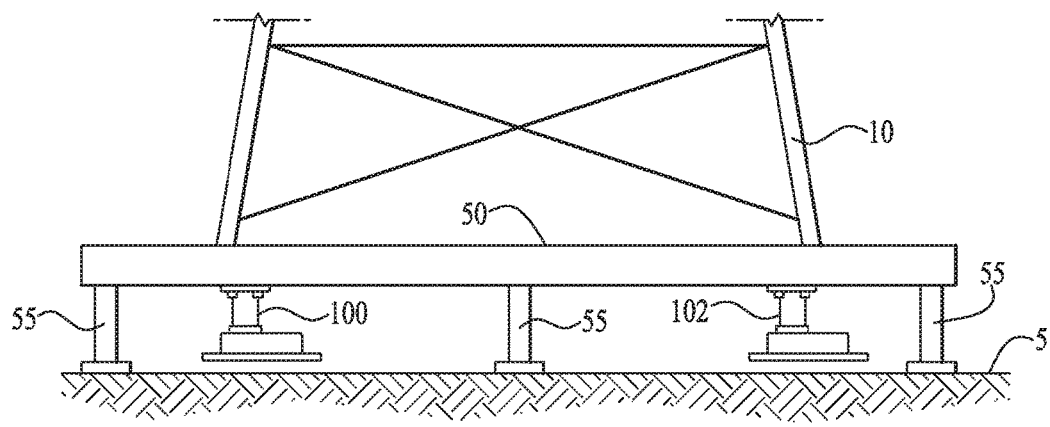
FIGS. 3-7 are partial views of the walking machine system of FIG. 1 illustrating the operation of the walking machine units.

The preferred embodiments will now be described with reference to the drawings. With reference to the above-listed drawings, this section describes particular example embodiments and their detailed construction and operation. To facilitate description, any element numeral representing an element in one figure will be used to represent the same element when used in any other figure. The embodiments described herein are set forth by way of illustration only and not limitation. It should be recognized in light of the teachings herein that there is a range of equivalents to the example embodiments described herein. Notably, other embodiments are possible, variations can be made to the embodiments described herein, and there may be equivalents to the components, parts, or steps that make up or augment the described embodiments.

FIGS. 1-7 are a series of schematic drawings for an example walking machine system for moving a large support structure shown as an oil rig 10 along a ground surface 5. The oil rig structure 10 is supported onto the ground or support surface by a plurality of support legs 55 attached to the bottom of the oil rig structure 50. The walking machine system includes a set of four lifting assemblies 100, 102 (other assemblies 104, 106 shown in FIG. 8 described below) with a lifting assembly arranged in position proximate each of the corners of the oil rig 10.

Figure 4:
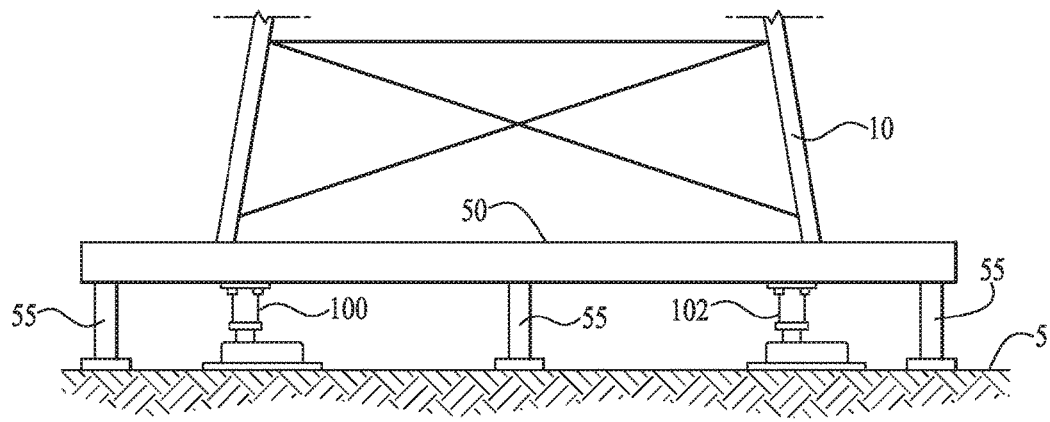
Figure 5:
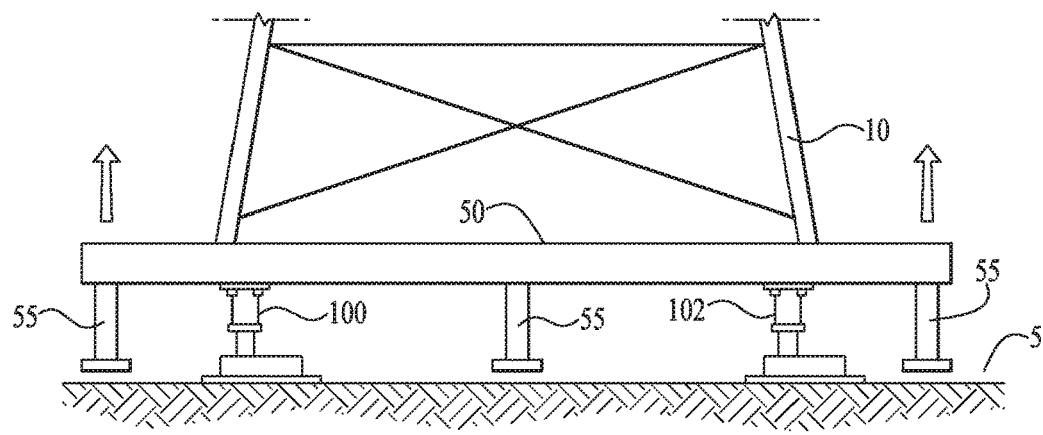
Figure 6:
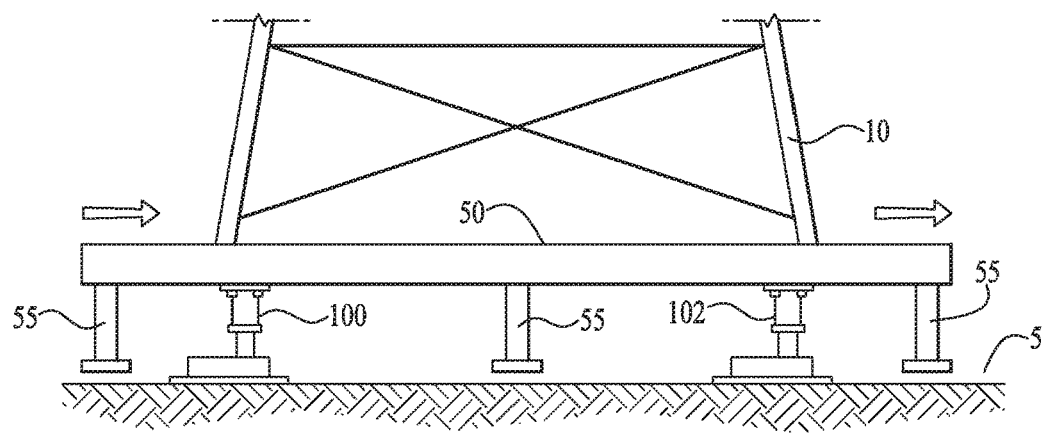
Figure 7:
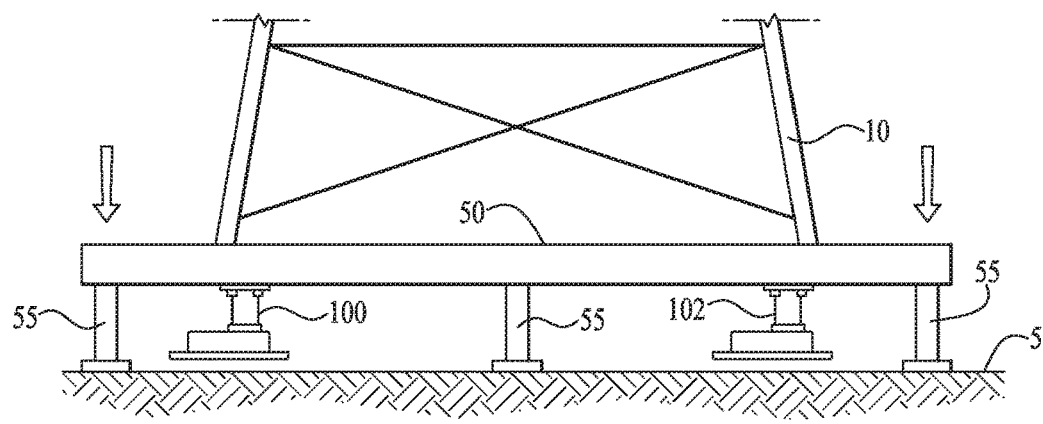

To avoid repetition, operation of the lifting assemblies 100, 102, 104, 106 will be described with respect to assembly 100. The lifting assembly 100 is set in position as illustrated in FIG. 1 with its lifting cylinder retracted. The lifting cylinder is raised partway as in FIG. 2 and contacts the oil rig support beam/structure 50 and connected thereto by bolting or other suitable attachments. The lifting cylinder is then retracted, thereby lifting the lower structure or jack pad of the lifting assembly off the ground (due to its attachment to the support beam 50 of the rig) and then the lifting assembly lower structure and jack pad are driven forward by the push-pull mechanism to the forward position as in FIG. 3. The lifting cylinder is then partially extended lowering the lifting assembly lower structure and jack pad to the ground as shown in FIG. 4. The lifting cylinder is then raised to the extended position thereby lifting the support structure 50 and support legs 55 off the ground as in FIG. 5. Once the rig is lifted, the lifting assembly lower structure (the foot) is driven rearward by the push-pull mechanism to the rearward position thereby moving the rig 10 forward as in FIG. 6. The lifting cylinder is then retracted, raising the lifting assembly lower structure as in FIG. 7 after which the lower structure may then be driven forward to the position as in FIG. 3. The process steps are then repeated.

Figure 8:
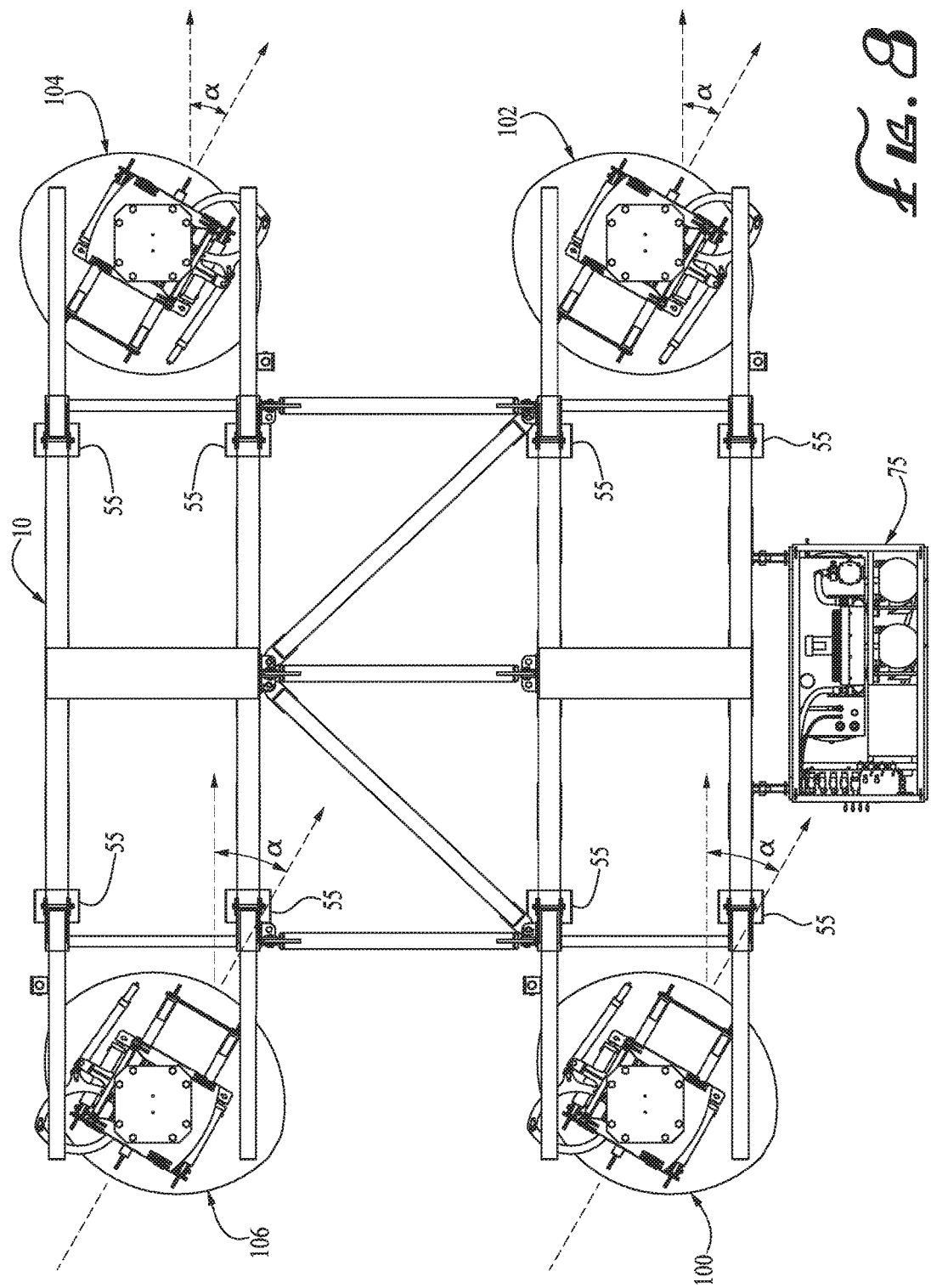
FIG. 8 is a top plan view of a walking machine system according to a preferred embodiment, with four walking machine units, one disposed at each of the four corners of the oil rig.

Further details of the lifting assembly and steering mechanism will now be described. FIG. 8 illustrates a top plan view of the walking machine comprised of the four lifting assemblies 100, 102, 104, 106 connected to the rig 10 (the substructure 50 of the rig 10 being removed), and the controller assembly 75. The lifting assemblies 100, 102, 104, 106 in FIG. 8 have each been steered to a selected spin or steering angle α (alpha), with the illustrated example of about 12° to the horizontal. Thus when engaged in the walking operation, the structure will be moved at a 12° diagonal walking direction (clockwise from straight forward as shown in the figure). The walking direction may be either diagonally forward and to the right or diagonally backward and to the left as desired depending the order and direction of the drive mechanisms.

As will be described, the steering mechanism comprises a control system and steering linkage operable to rotate/steer about an angle of at least on the order of about 179°, or slightly more, to accommodate steering of the walking unit (in combination with the push-pull drives driving the walking mechanisms forward or backward) in any desired direction.

FIGS. 9-23 illustrate details of the walking machine unit 100 according to an embodiment. The walking unit 100 includes generally a lift assembly 120 and a walking foot assembly 300 including a lower foot or pad for contacting the ground 5, the travel mechanism 305 (that includes the rolling assembly 400), the lifting assembly or lift mechanism 120, the steering assembly and drive 150, 200, and the steering support assembly 130.

It is noted that in FIGS. 9-13 all the actuators are shown in the retracted conditions including the actuator of the lift mechanism 120, the actuators 330, 340 of the travel mechanism 305, and the steering actuator 250 of the steering assembly 150-200.

Figure 15:
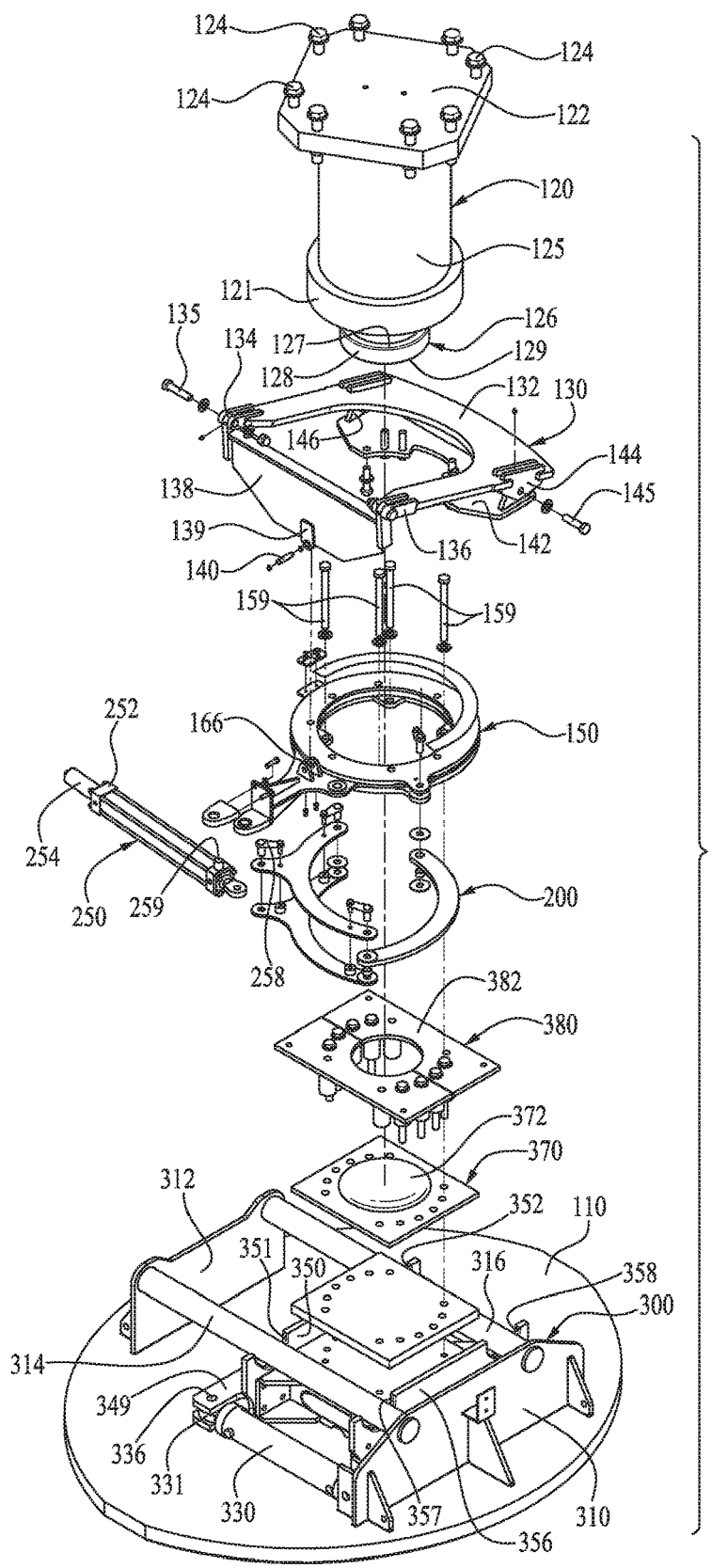
FIG. 15 is an exploded isometric view of the walking machine unit of FIG. 9.

Specifics of the elements will now be described with particular reference to exploded view of FIG. 15 as well as the prior figures.

The lift assembly 120 includes an outer housing or main housing 125, in which is disposed an actuating piston cylinder 126. The main housing includes a top flange 122 which attaches to the load/rig and a bottom flange 121. The piston cylinder 126 has a bottom collar 128 with a shoulder 127 for engaging a lifting plate 380 as will be described in more detail below with respect to subsequent figures. The bottom surface of the piston cylinder 126 comprises a spherical concave surface 129 (see also FIG. 28) for engaging the corresponding convex dome surface 372 of the engaging plate 370 in the foot assembly 300. The top plate 122 is connected via bolts 124 to the support structure 50 of the load. The foot assembly 300 includes the bottom foot or pad 110 upon which the various components are mounted including side plates 310 and 312 which are interconnected by guide rods 314, 316 which nests within saddles or indentations 351, 357 and 352, 358 within plates 350, 356. The actuators 330, 340 are operative for translating the travel mechanism 305 between the forward and rearward positions for the push pull operation. The left actuator 330 is attached on one end by a pin connection 334 to the support plate 310 and on the other end to support plate 350 by a pin connector 336 and cross support 349. The right actuator 340 is constructed in similar fashion.

The steering mechanism 150, 200 is now described with particular reference to FIGS. 15-18. The steering mechanism comprises an actuating assembly 250, a double linkage assembly 200, and a steering torsion ring assembly 150.

Figure 16:
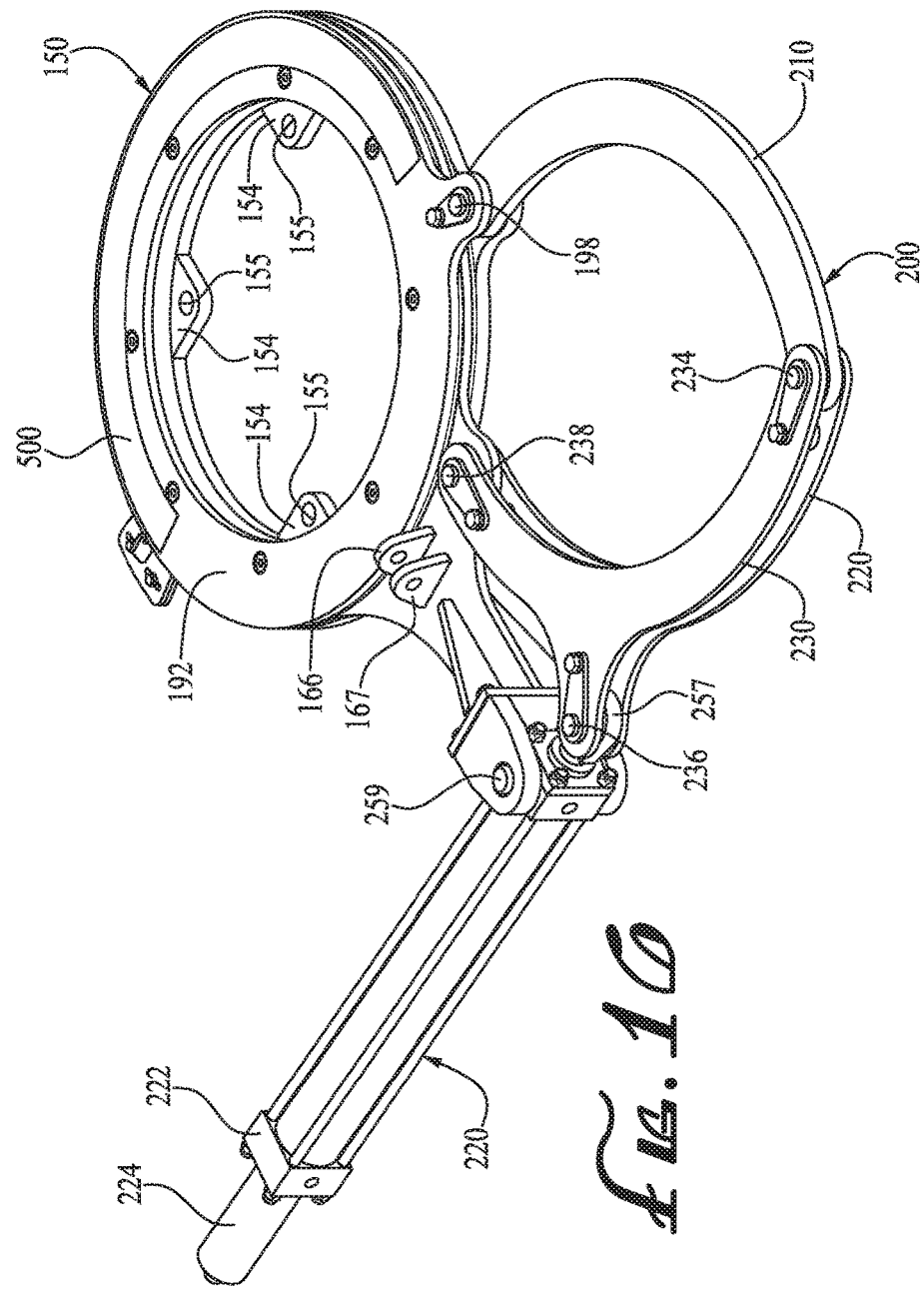
FIG. 16 is an isometric view of the steering linkage and actuator portion of FIG. 9 on an enlarged scale.
Figure 17:
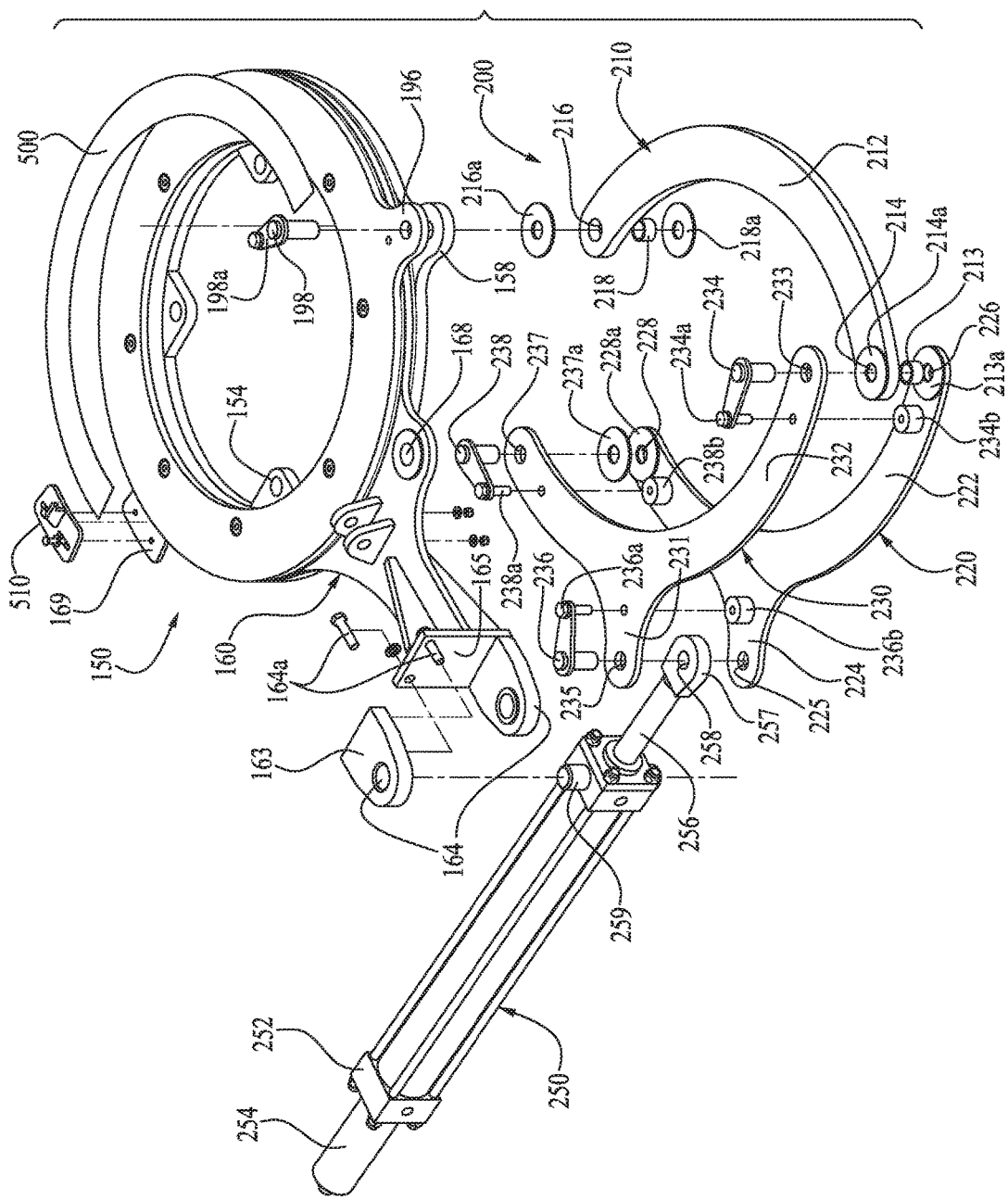
FIG. 17 is a partially exploded isometric view of the steering linkage and actuator portion of FIG. 16.

The actuation assembly 250 (as best shown in FIGS. 16-17) comprises the main housing 252 comprising a piston and cylinder combination wherein the piston rod 256 actuates and travels outwardly from the cylinder housing 252 which includes disposed thereon a magneto-strictive linear sensor or linear encoder 254, such as a Temposonics® sensor available from MTS Sensors of Cary, N.C., that directly registers the displacement of the cylinder rod 256 with respect to the cylinder housing 252. An end connector 257 is disposed or attached on the end of the piston rod 256. The end connector 257 includes a central hole 258 for attachment to the two bar linkage 200.

Though an embodiment of a two-bar linkage is shown and described, a three bar linkage or other multi-linkage system may be employed.

Though shown as a hydraulic actuator, other actuation mechanisms may be employed such as a servo motor, a screw drive, a rack and pinion drive, or other suitable mechanical or electro-mechanical, hydraulic or pneumatic drive mechanism. The mechanics of the linkage system allow for a simple form linear actuator to provide the motive force for the rotational drive mechanism as well as a simplified feedback system whereby the actuation position of the actuator is directly related to the rotational position of the steering mechanism facilitating automatic or semi-automatic control.

The displaced position of the linear actuator may be detected by a linear transducer or similar instrument for devices similar to hydraulic or pneumatic cylinders or by a rotary encoder for linear actuators with a hydraulic, pneumatic, or electrically driven motor.

The linear actuators may be controlled via a closed loop feedback system such as via a central processor that monitors and adjusts the displaced position of each linear actuator. A program within or otherwise running the central processor, relates linear actuator displacement to rotational orientation of the roller/foot assembly.

The two bar linkage 200 comprises a first linkage including top and bottom (first) linkage elements 230, 220, and a second linkage 210. The second linkage comprises a curved linkage body. The top and bottom first linkage elements 230, 220 each comprises a curved body section 232, 222 and a central extending portion 231, 224. Holes 235, 225 are provided in the extending sections 231, 224 through which a pin connector 236 is passed through each of the holes and through the hole 258 in the end connector 257 of the actuator 250. The pin 236 is secured in place by an attachment bracket and screw/bolt element 236a which passes through the hole in the upper first linkage portion 230, through a spacer 236b into a threaded connection within the lower first linkage section 220 thereby securing the first linkage 220/230 in a rotatable fashion to the end connector 257 of the actuator 250.

The first linkage 230/220 is then connected via pivoting connection to the second linkage 210 by a pin connector 234 passing through a hole 233 in the upper first linkage portion 230 through hole 214 in the second linkage 212 through a bushing 213 and then through a hole 226 in the end of the lower first linkage portion 220. The pin 234 is secured in place via screw 234a attached to a connecting bracket, the screw 234a passing through a hole in the upper first linkage portion 230 through a spacer 234b and then secured to the bottom first linkage portion 220 in the threaded connection therein.

Figure 18:
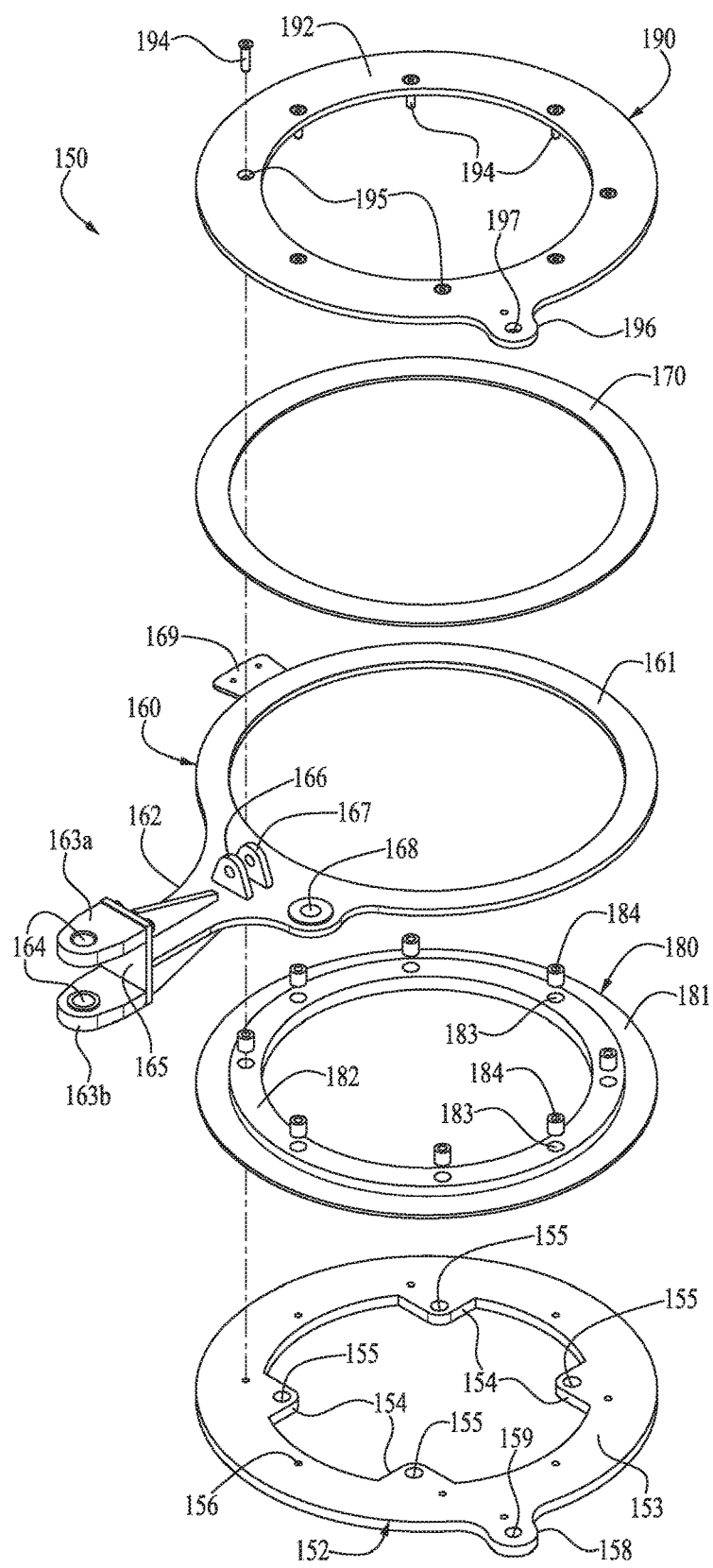
FIG. 18 is an isometric exploded view of the turret assembly portion of the steering linkage of FIG. 17.

The steering ring assembly 150 is best shown in FIGS. 15-18 and in the exploded view in FIG. 18. The steering ring assembly 150 comprises a bottom retaining ring 152, a top retaining ring 190, a torsion ring assembly 160 disposed between the bottom retaining ring 152 and the top retaining ring 190, a bottom wear ring 180 disposed between the a bottom retaining ring 152 and the torsion ring assembly 160, and an upper wear ring 170 disposed between the top retaining ring 190 and the torsion ring assembly 160.

The bottom retaining ring 152 is a flat washer-like shaped structure with four tabs 154 for attaching the steering assembly to the walking foot assembly. The bottom retaining ring 152 includes a pin connection lug 158 on the outside of the ring for connection to the linkage 212. The bottom retaining ring 152 also includes eight threaded holes 156 for fastening the steering assembly rings 190, 152 together with the wear ring 180. Rotation of the steering rings or collars 152, 190 are operative for rotation of the lower support structure (rolling assembly 400 and foot pad 110) via connection to the lift plates 380, 370.

The top retaining ring 190 is a flat washer-like shaped structure 192. The top retaining ring 190 includes eight countersunk, threaded through holes 195 for fastening the assembly via screws/bolts 194. The top retaining ring 190 also includes a pin connection lug 196 disposed on the outside of the ring for connection to the linkage 212. The top retaining ring rotates with the walking foot assembly.

The bottom wear ring 180 comprises a flat washer-like shaped outer lip 181 with a raised center portion 182. The bottom wear ring 180 may be made out of nylon or other a suitable material having superior wear resistance and low friction properties such as Nylatron® nylon available from DSM Engineering Plastic Products, Inc. of Reading, Pa.

The upper wear ring 170 is disposed between the top retaining ring 190 and the torsion ring assembly 160 and is free to rotate. The upper wear ring 170 may also be made of nylon or other a suitable material having superior wear resistance and low friction properties such as Nylatron® nylon.

The torsion ring assembly 160 remains in a fixed position and does not rotate with the walking foot assembly. The torsion ring assembly 160 includes a flat washer-like shaped central portion 161, a trunnion or extension arm section 162, and mounting tabs 163a, 163b for connection to the steering actuator 250. The central portion 161 of the torsion ring assembly 160 is disposed against the outer lip 181 and outside of the raised center portion 182 of the bottom wear ring 180. The extension arm 162 includes the mounting brackets or tabs 163a, 163b, the top bracket 163a being removably attached by screws 164a to mounting plate 165. The steering actuator 250 is pivotally mounted to the extension arm 162 via hinge pins disposed within the holes 164 in the mounting tabs 163a, 163b.

The steering ring assembly 150 is assembled via screws/bolts 194 passing through the countersunk through holes 195 in the top retaining ring 190, passing through the interiors of the upper wear ring 170 and the torsion ring assembly 160, through the spacers 184, through the holes 183 in the bottom wear ring 180, and then secured to the threaded holes 156 of the bottom retaining ring 152. The spacers 184 may relieve the wear rings 170, 180 of the clamping force enacted by the screws 194. The spacers 184 may include flat ends that bear on the retaining rings 190, 152 providing a metal to metal interface that may help avoid over-compression of the wear rings 170, 180.

The screws/bolts 194 are arranged in a spaced, circular pattern to provide equal amounts of adherence throughout the layout. The screws/bolts 194 are flat head elements that allow clearance between the lift cylinder and the top retaining plate 190 of the steering ring assembly.

The second linkage 210 includes a hole 216 in the end distal from the first linkage 230/220. The hole 216 is aligned with the holes in lugs 196, 158 and disposed therebetween and rotationally secured via a pin 198 passed through the hole in lug 196, through hole 216, through bushing 218 and then secured into hole 159 within lug 158.

The second end of the first linkage 230/220 is rotationally connected to the torsion ring 160. The second end of the first linkage 230/220 includes holes 237, 228 which are aligned on opposite sides of the hole 168 of the torsion ring 160 proximate the arm section 162. A pin 238 is disposed through the hole 237 in the upper first link portion 230, through the hole 168 in the torsion ring 160, and into the hole 228 in the lower first link portion 220. The pin 238 is secured in place by a positioning bracket secured by a screw/bolt 238a which is passed through a hole in the end of the upper first link portion 230, through spacer 238b, and into a threaded hole in the lower first link portion 220.

Low friction washers (such as washers 213a, 214a, 218a, 216a, 228a, 237a), which may be constructed or coated with low friction material, such as a nylon material, are provided between rubbing surfaces to reduce friction.

Figure 26:
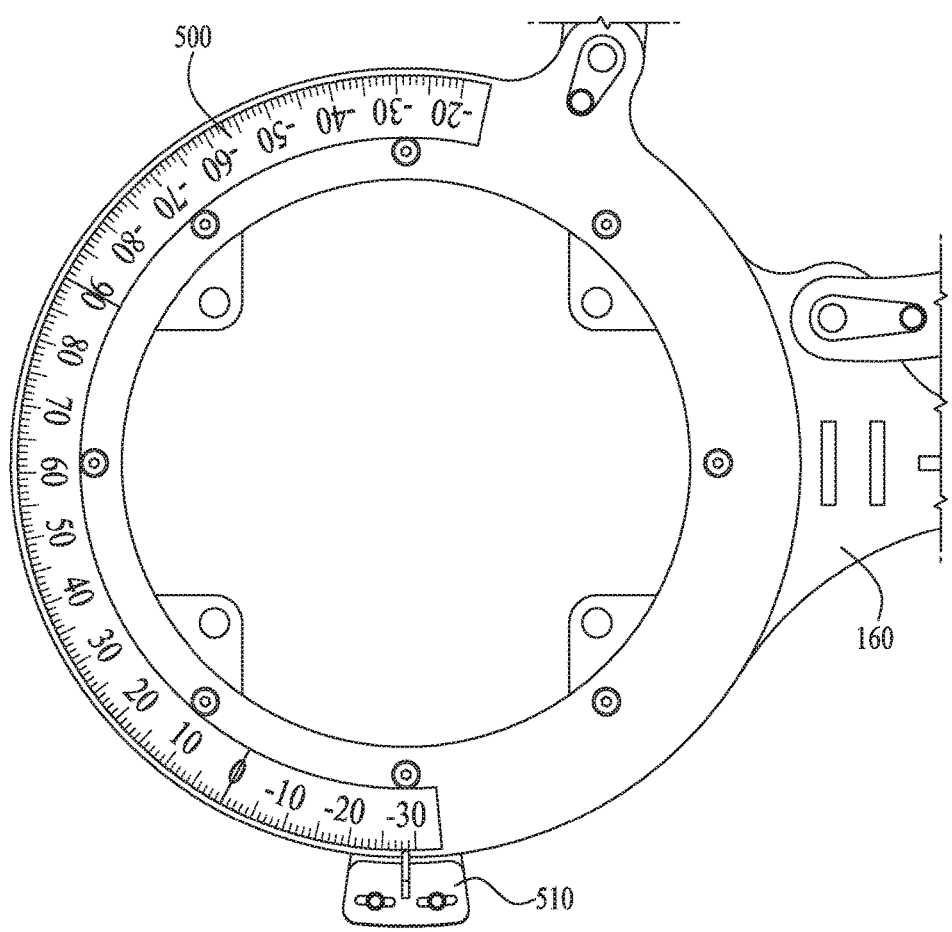
FIG. 26 is a top plan view of the torsion ring illustrating the gauge and indicator.

A mounting tab 169 is attached or included with the central portion 161 of the torsion ring 160. An indicator plate 510 is mounted to the mounting tab and includes a pointer for indicating the rotational position of the steering mechanism relative to the indicator 510 which remains fixed (rotationally) relative to the lifting mechanism 120 and the load/rig. A decal or label 500 is provided in a visible location on the top surface of the top retaining ring 190, the label 500 bearing markings or readouts for indicating the rotational position of the steering mechanism as pointed to by the indicator 510. Alternately, the markings may be drawn or etched directly onto the top retaining ring. FIG. 26 is an enlarged view of the label 500 showing the rotational measurement markings according to an embodiment, further details of which will be described later.

Figure 19:
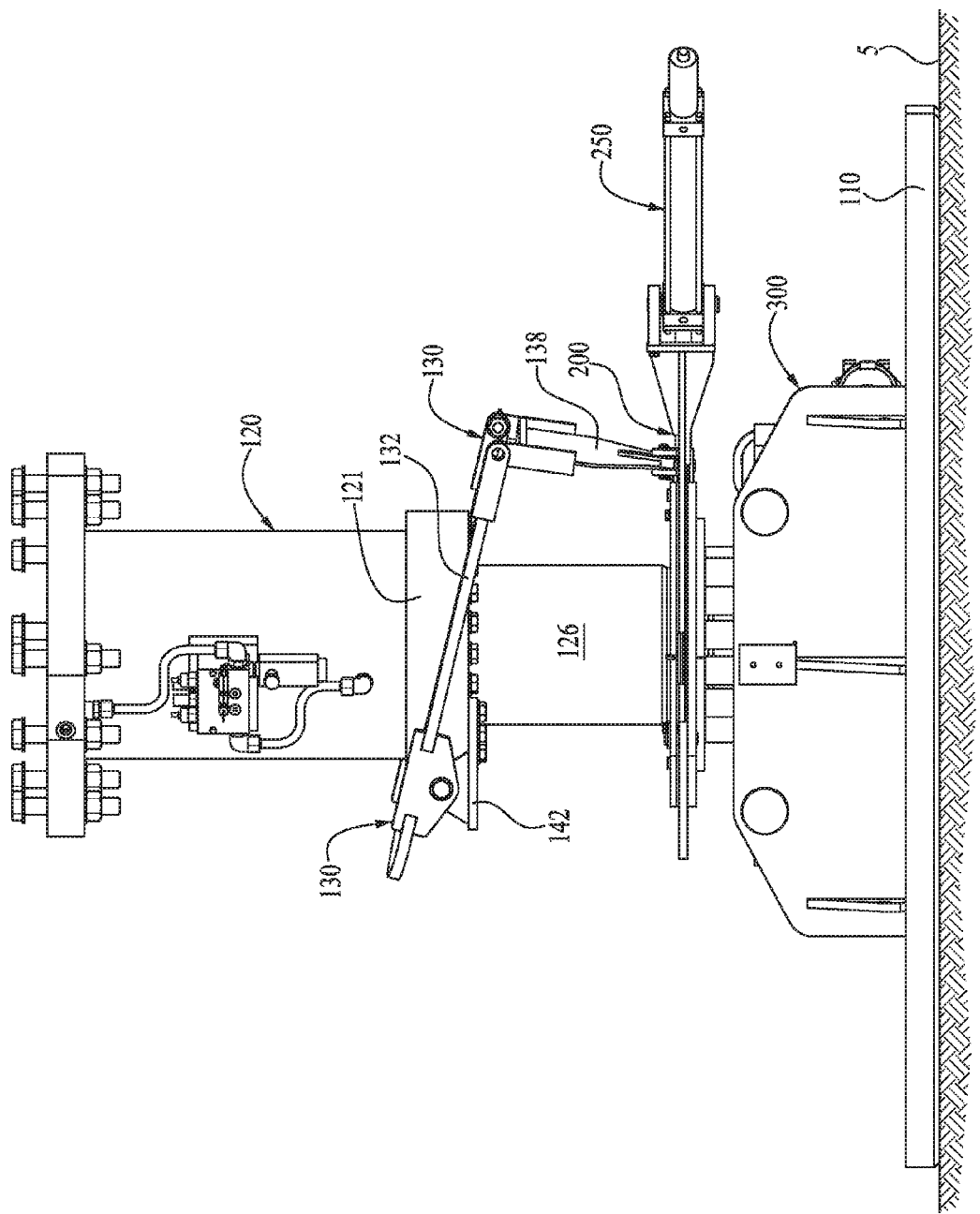
FIG. 19 is a right side elevation view (slightly rotated relative to the view in FIG. 10) of the walking machine unit of FIG. 9 with the lift cylinder in the extended position.
Figure 20:
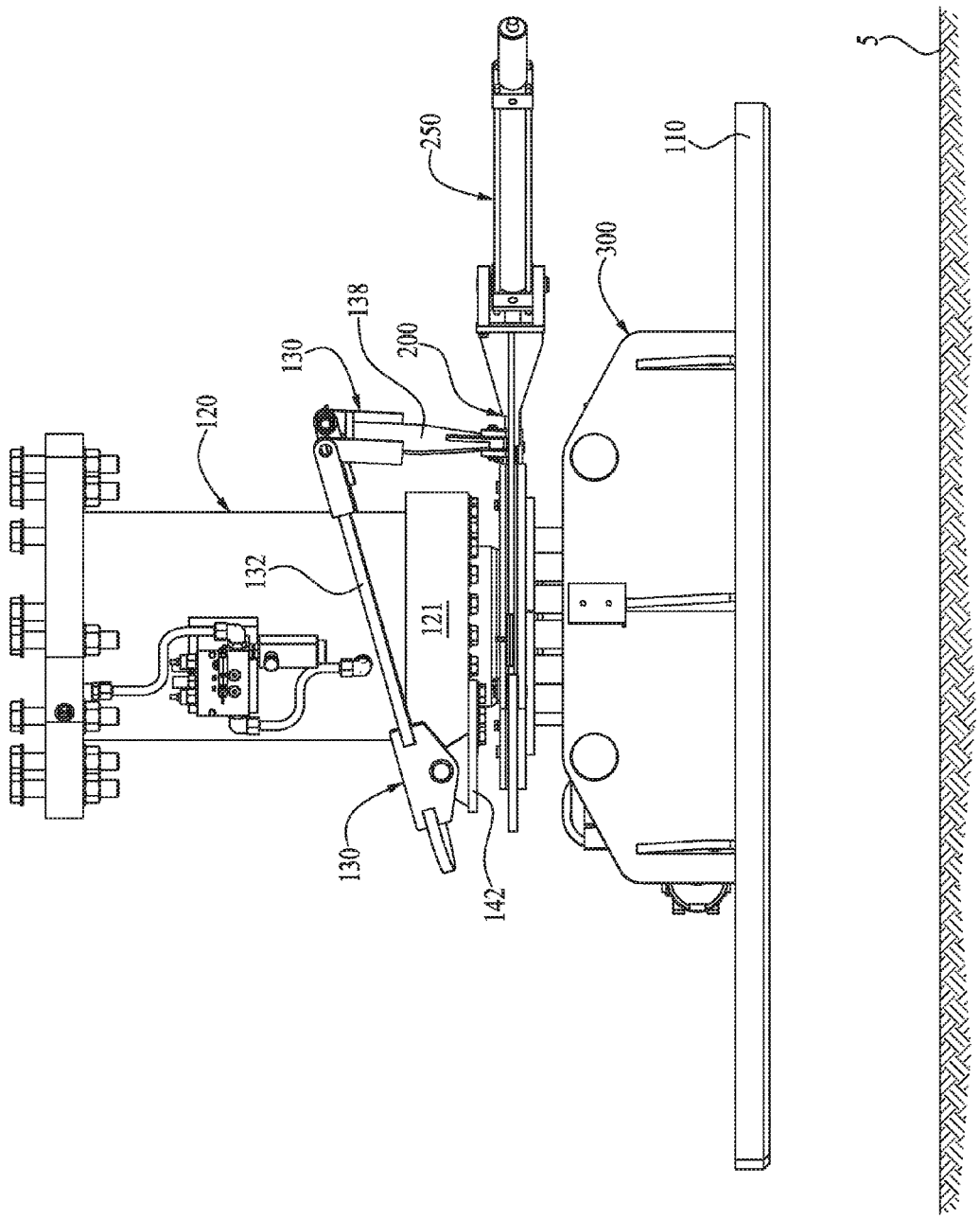
FIG. 20 is a side elevation view of the walking machine unit as in FIG. 19 with the lift cylinder in the retracted position.

The steering ring assembly 150/200 is supported by support assembly 130 while also providing some freedom of motion. The support assembly 130 (as best shown in FIGS. 10, 15, 19 and 20) comprises three plates sections: a first plate 142 which is attached to the lower lifting cylinder flange 121 (via bolts), a U-shaped central plate section 132 which is pivotally connected (via hinges 144, 146 and hinge pins 145) to the first plate 142, and a third plate 138 which is pivotally connected (via hinges 134, 136 and hinge pins 135) to the central plate 132. Since the support assembly 130 is attached to the lift mechanism 120, it remains rotationally stationary during steering operation. The third plate 138 then is pivotally connected to the torsion assembly 150 via hinges 139, 166, 167 and hinge pin 140. The support assembly thus allows the steering assembly 200 to travel vertically with the piston cylinder 126 as shown in FIGS. 19, 20.

Figure 9:
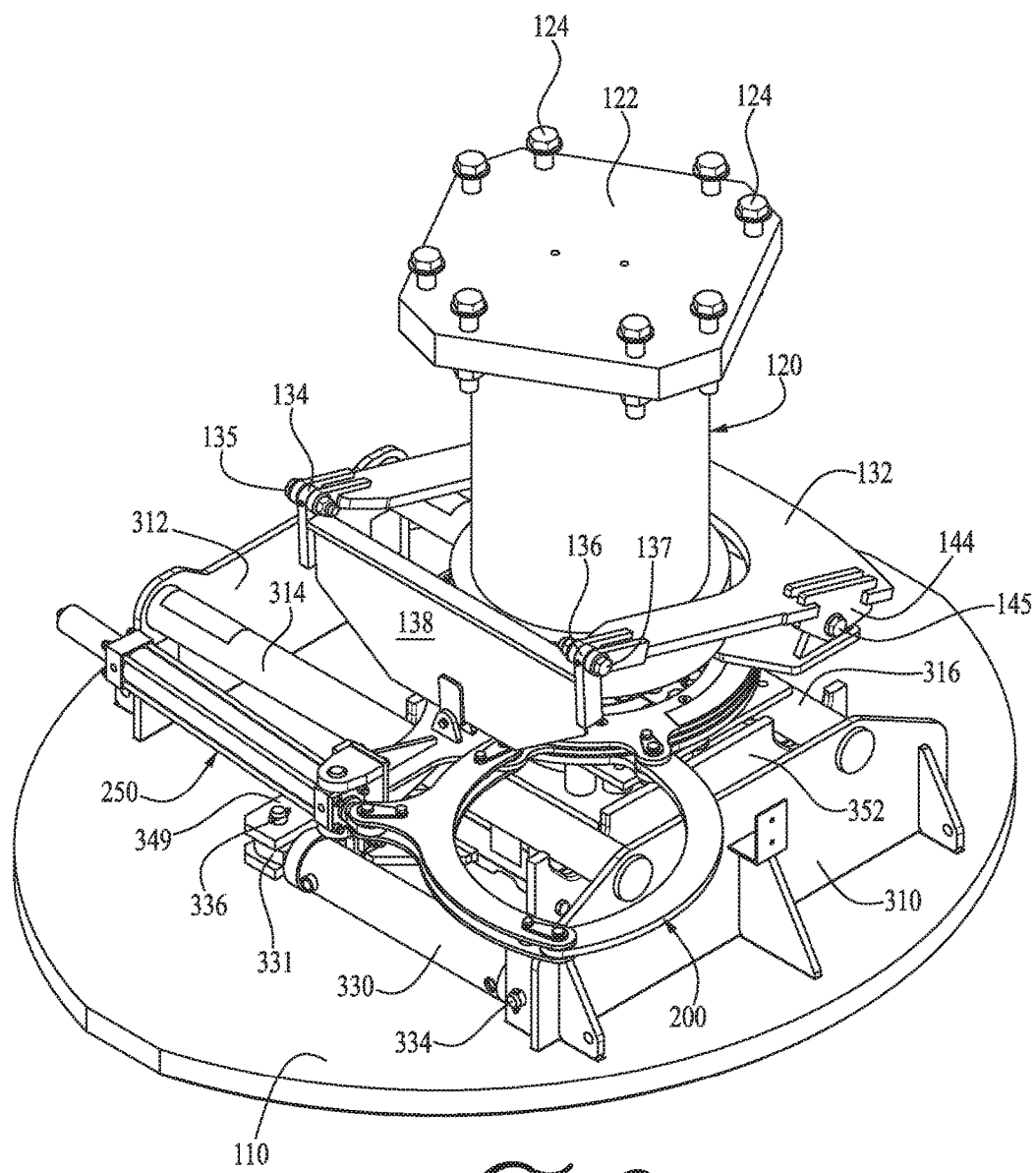
FIG. 9 is a front left top isometric view of a walking machine unit of FIG. 8.
Figure 10:
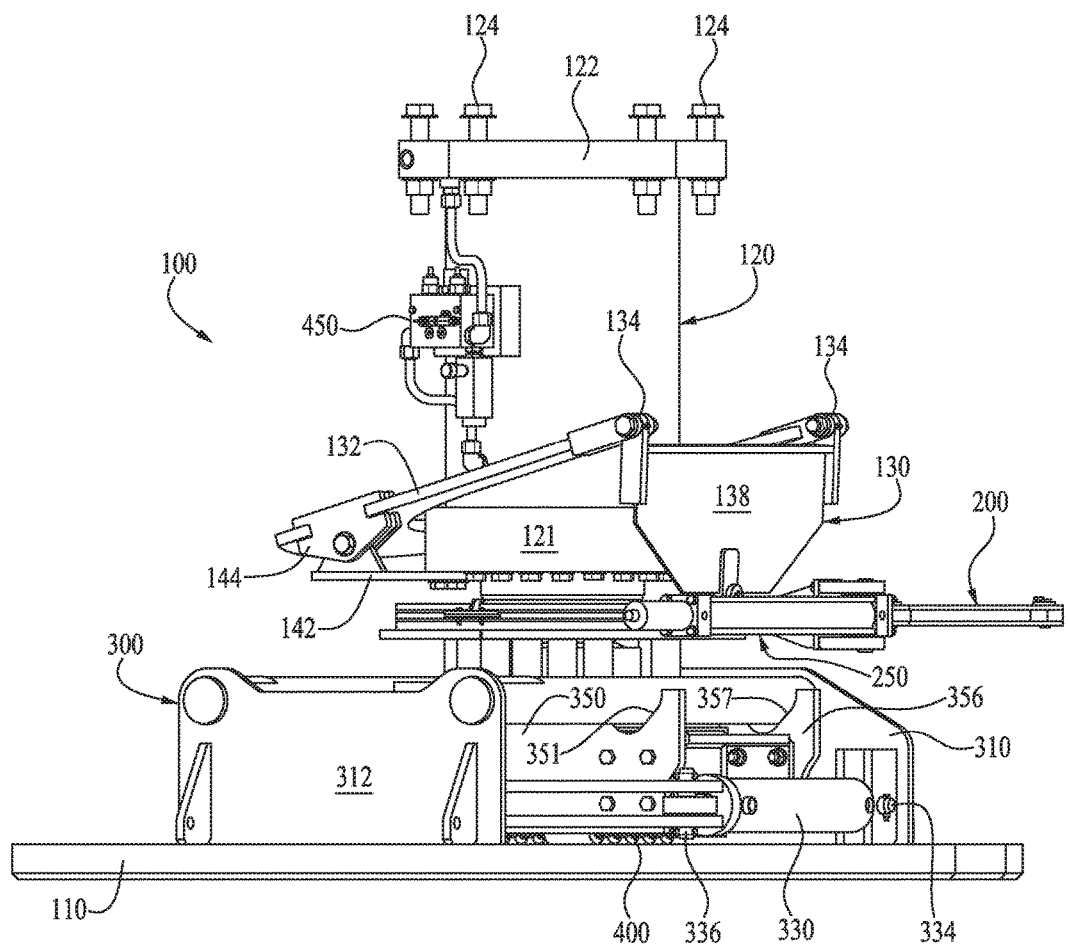
FIG. 10 is right side elevation view of the walking machine unit of FIG. 9 with the lift cylinder in the retracted position.
Figure 11:
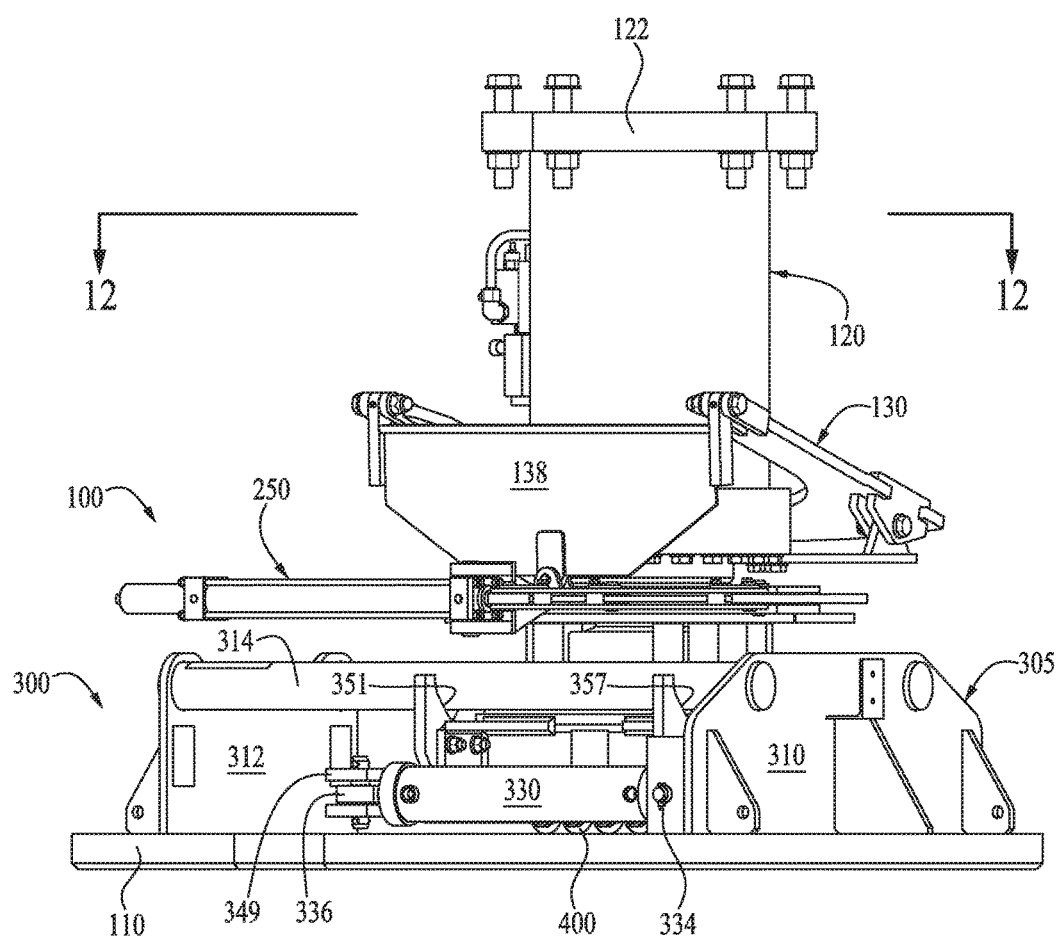
FIG. 11 is front side elevation view of the walking machine unit of FIG. 9.
Figure 12:
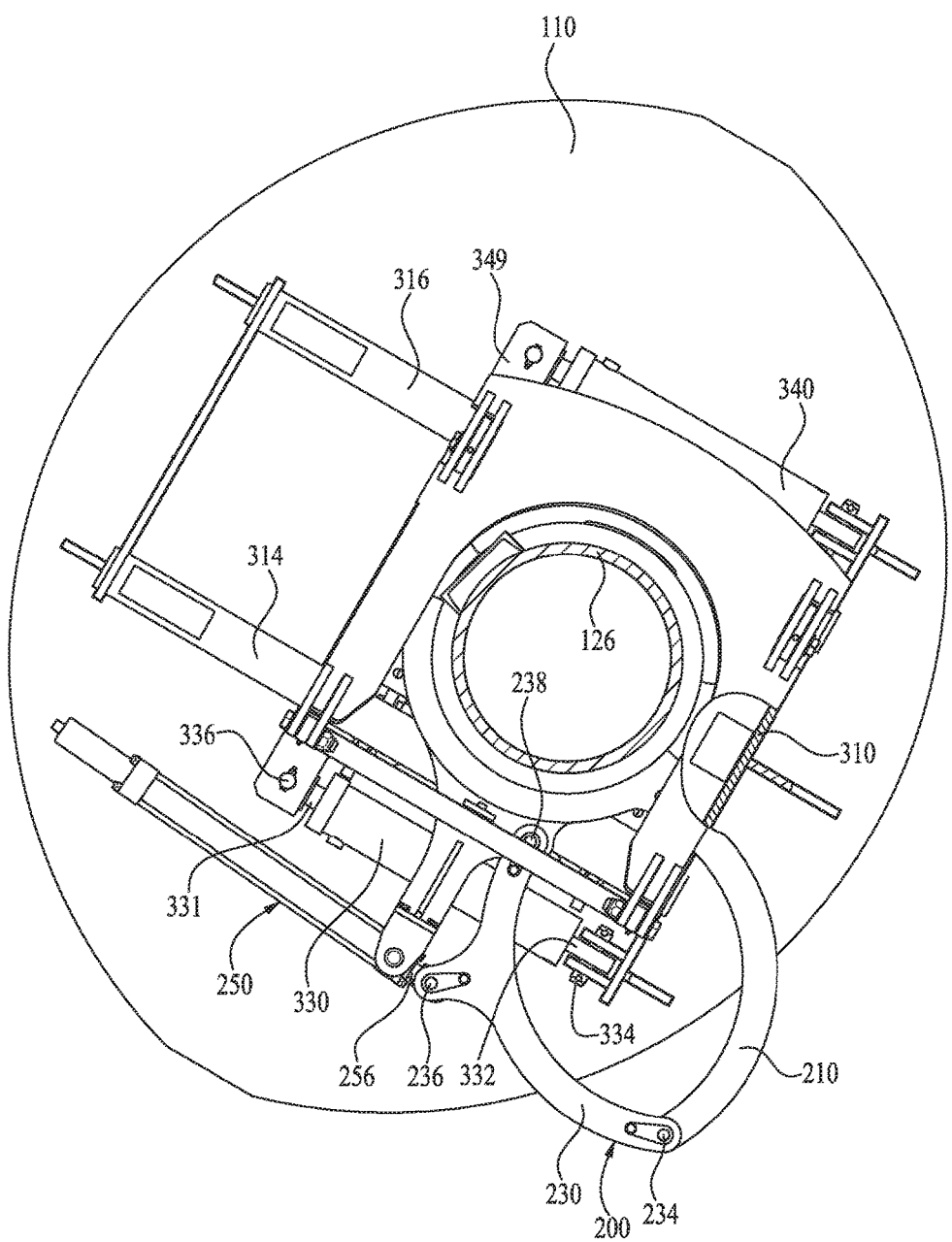
FIG. 12 is a cross-sectional view of the walking machine unit of FIG. 11 taken along lines 12-12.
Figure 13:
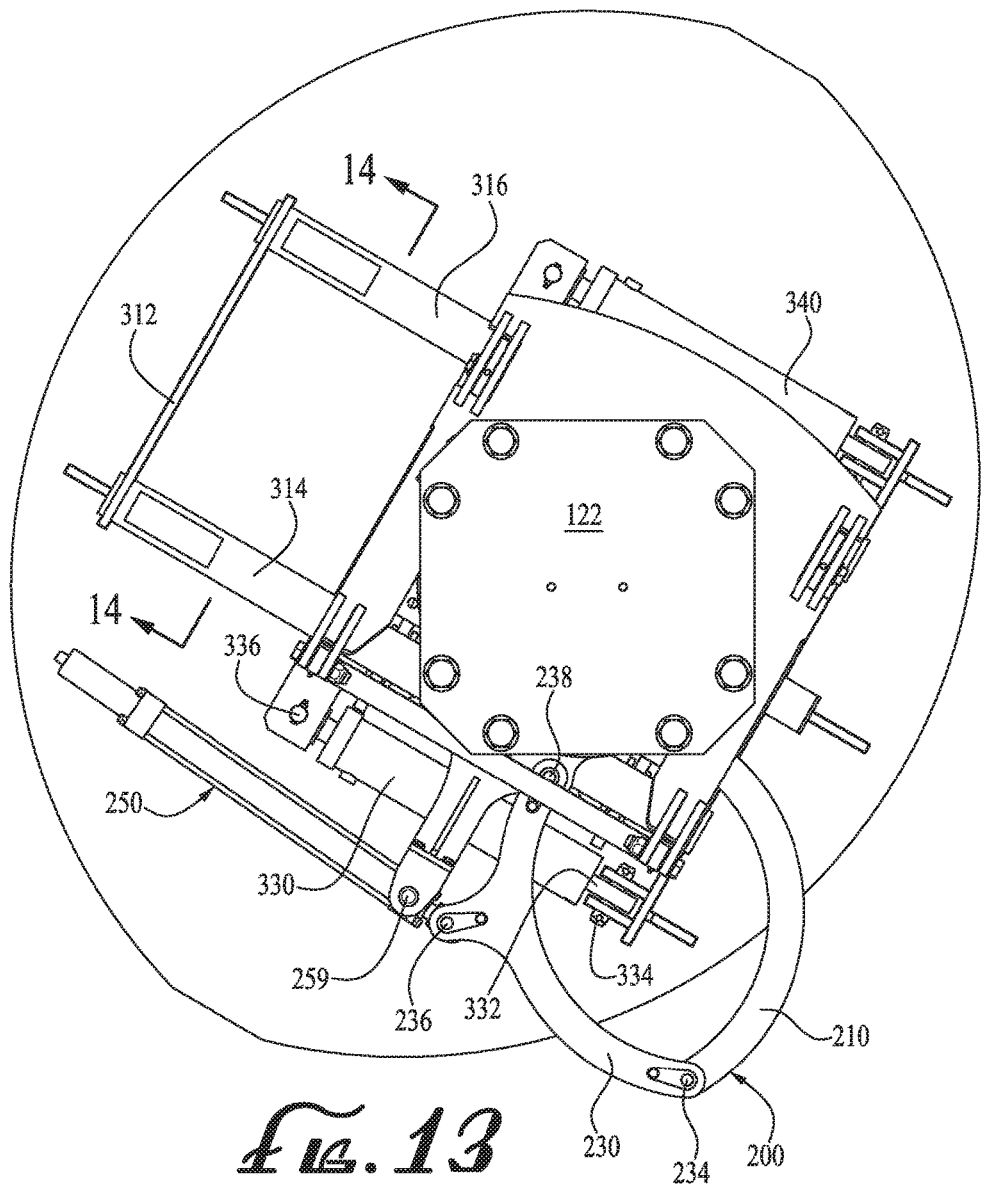
FIG. 13 is a top plan view of the walking machine unit of FIG. 9
Figure 14:
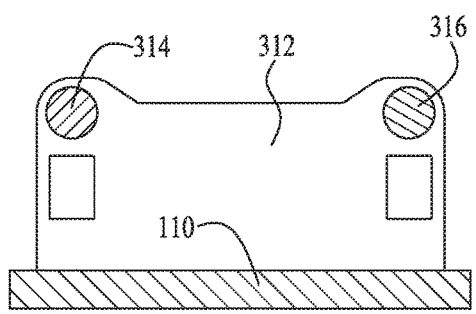
FIG. 14 is a cross sectional view of a portion of FIG. 13 taken along lines 14-14.

FIG. 19 illustrates a right side elevation view, slightly rotated relative to the view in FIG. 10, of the walking machine unit of FIG. 9 with the piston cylinder 126 in the extended position whereby the load/rig would be in the lifted condition.

FIG. 20 is a right side elevation view of the walking machine unit as in FIG. 19 with the piston cylinder 126 of the lifting cylinder 120 in the retracted position.

Figure 21:
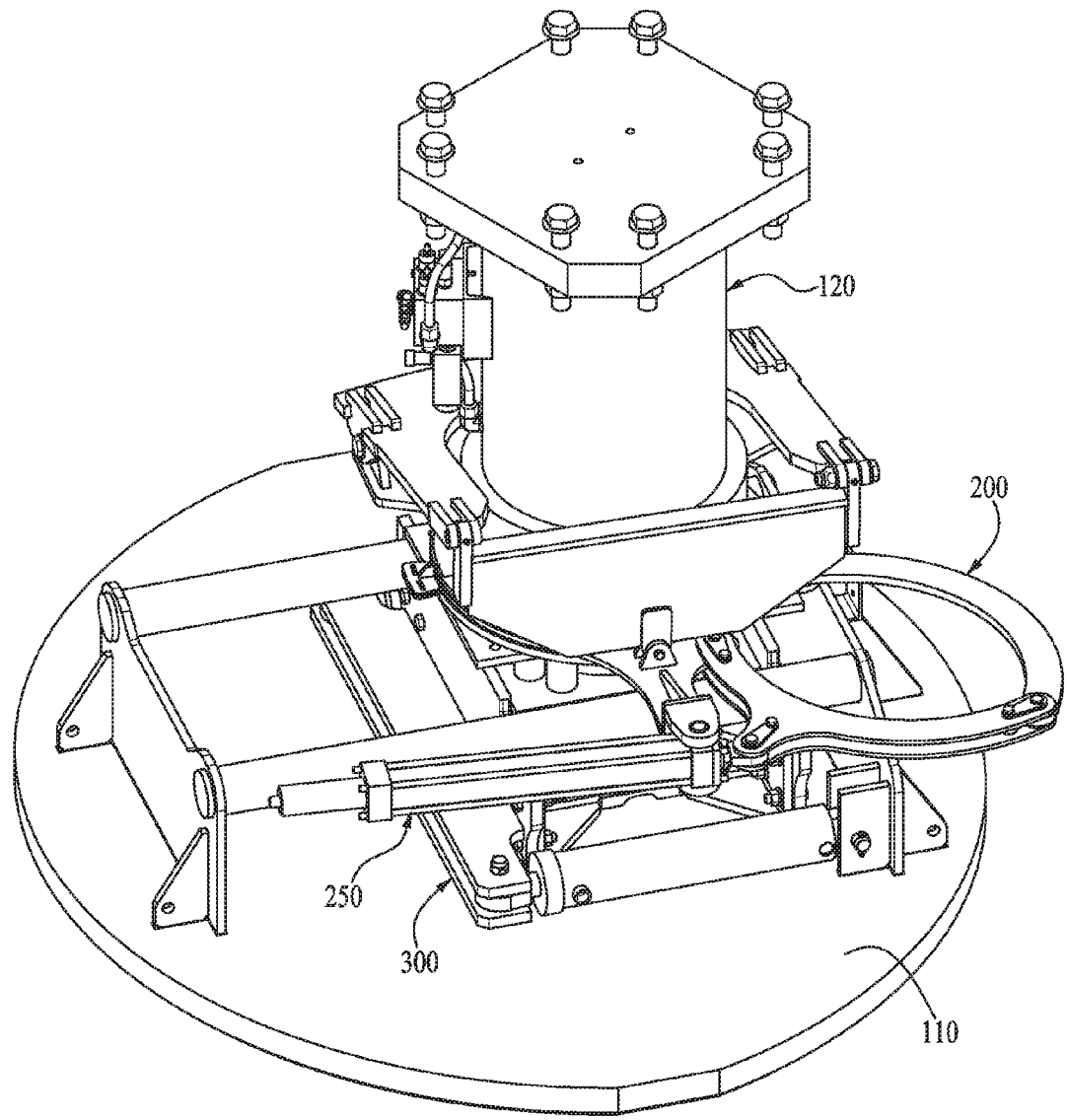
FIG. 21 is an isometric view of the walking machine unit of FIG. 20 with the lift cylinder in the retracted position and the steering actuation cylinder in the retracted position.

FIG. 21 is an isometric view of the walking machine unit of FIG. 20 with the lift cylinder in the retracted position and the steering actuation cylinder 250 in the retracted position.

Figure 22:
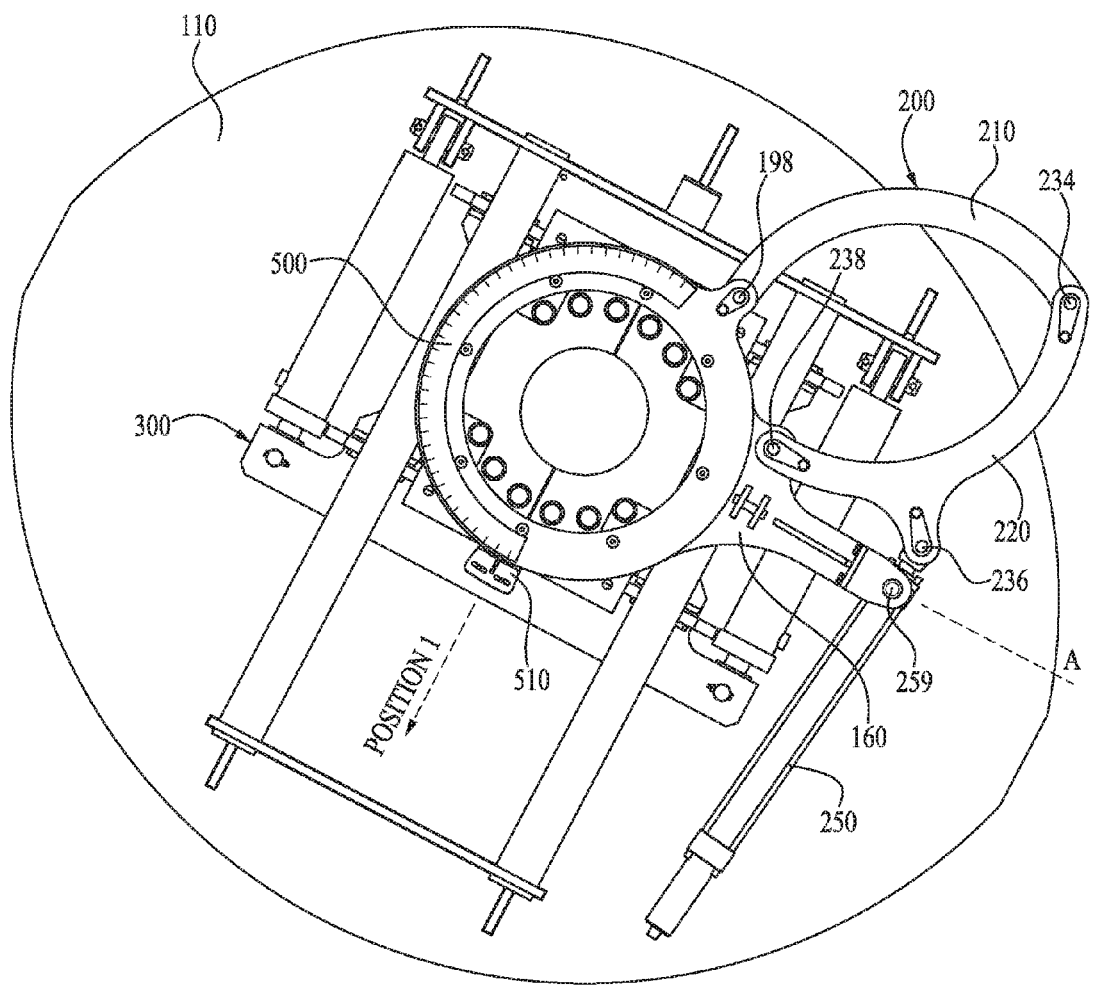
FIG. 22 is a top plan view of the walking machine unit of FIG. 21 with the steering actuation cylinder in a first position, fully retracted.

Once in the retracted lifting position with the walking assembly lifted off the ground, the actuator 250 may be actuated to rotate the walking assembly to the desired steering position. FIGS. 22-25 are each top plan views of the walking machine unit of FIG. 21 with the top mounting flange removed to make lower components visible, these figures illustrating four different actuation positions of the steering actuation cylinder 250, and thus four rotational steering positions. It is noted that the torsion arm 160 (the position shown by line "A") and the attached indicator 510 remain stationary in the figures as being fixed relative to the lifting cylinder and load. FIGS. 22-25 show four rotational steering positions as follows:

In FIG. 22, the steering actuation cylinder 250 is in a first position, fully retracted, the indicator 510 pointing to the gauge 500 at a first mark.

Figure 23:
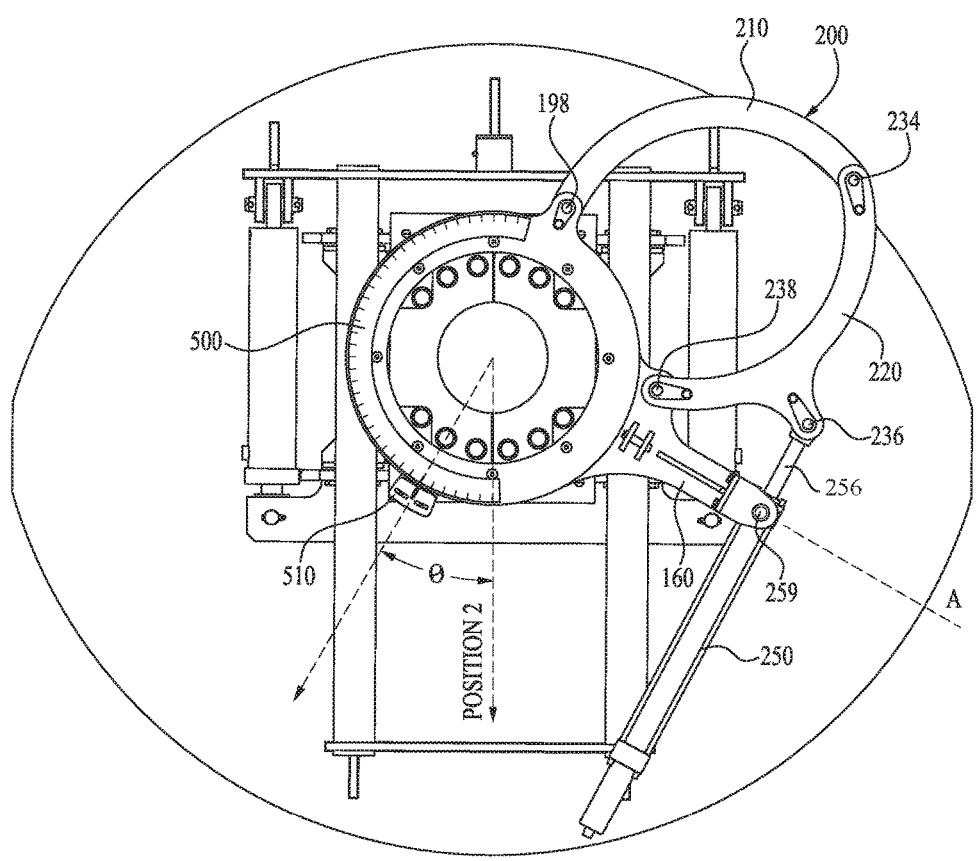
FIG. 23 is a top plan view of the walking machine unit of FIG. 21 with the steering actuation cylinder in a second position, partially extended.

In FIG. 23 the steering actuation cylinder 250 is in a second position, partially extended, the indicator 510 pointing to the gauge 500 at a second mark, having rotated from the first position by an angle $\Theta$ of about 30°.

Figure 24:
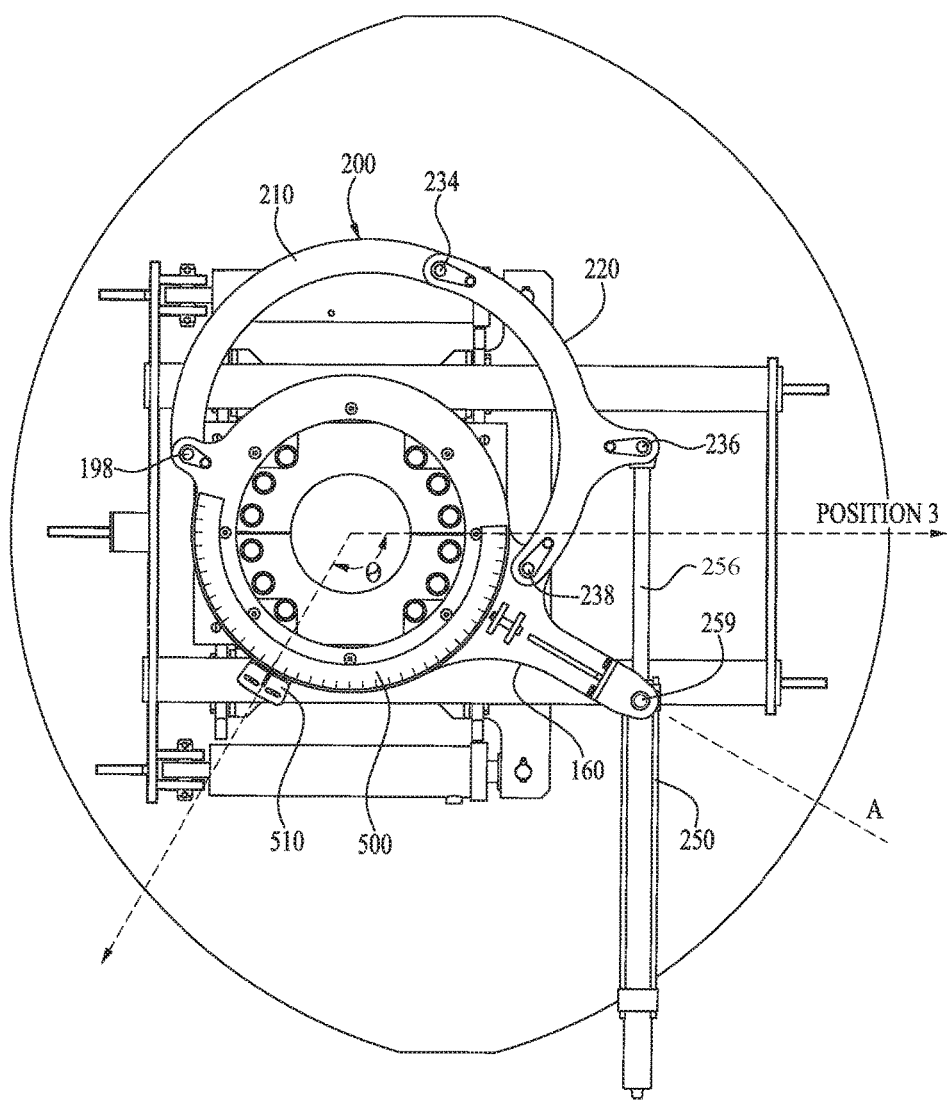
FIG. 24 is a top plan view of the walking machine unit of FIG. 21 with the steering actuation cylinder in a third position, partially extended more than in FIG. 23.

In FIG. 24 the steering actuation cylinder 250 is in a third position, partially extended, the indicator 510 pointing to the gauge 500 at a third mark, having rotated from the first position by an angle $\Theta$ of about 120°.

Figure 25:
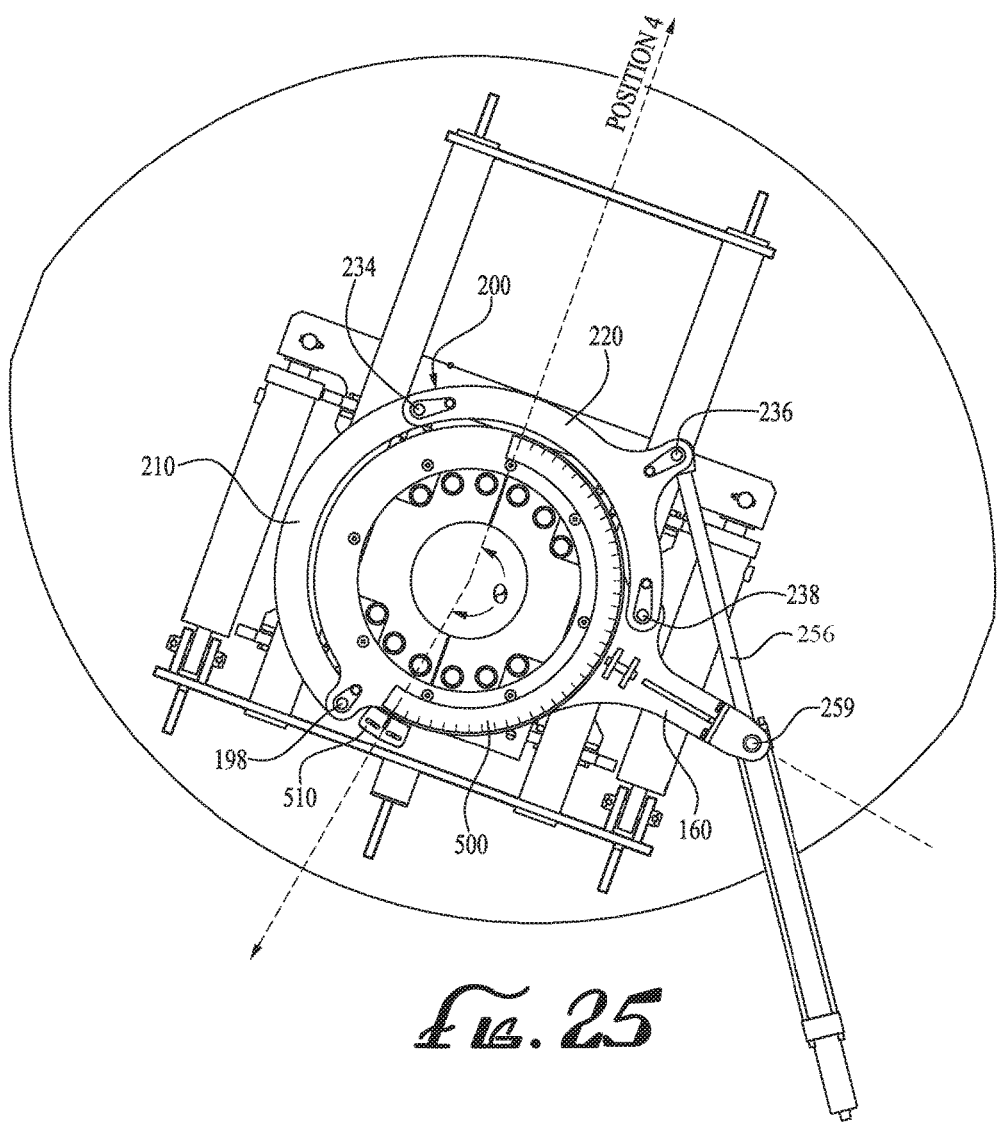
FIG. 25 is a top plan view of the walking machine unit of FIG. 21 with the steering actuation cylinder in a fourth position, fully extended.

In FIG. 25 the steering actuation cylinder 250 is in a fourth position, fully extended, the indicator 510 pointing to the gauge 500 at a third mark, having rotated from the first position by an angle $\Theta$ of about 185°. Thus the geometry of the multi-linkage connector, comprising the first linkage 230/220 and the second linkage 210, is operative for rotating the steering ring over an angle of at least 179°, or somewhat larger, upon motion of a single stroke of the steering actuation cylinder 250. A larger angle in excess of 185° is not required because the travel mechanism 305 may be operated in either direction.

Figure 27:
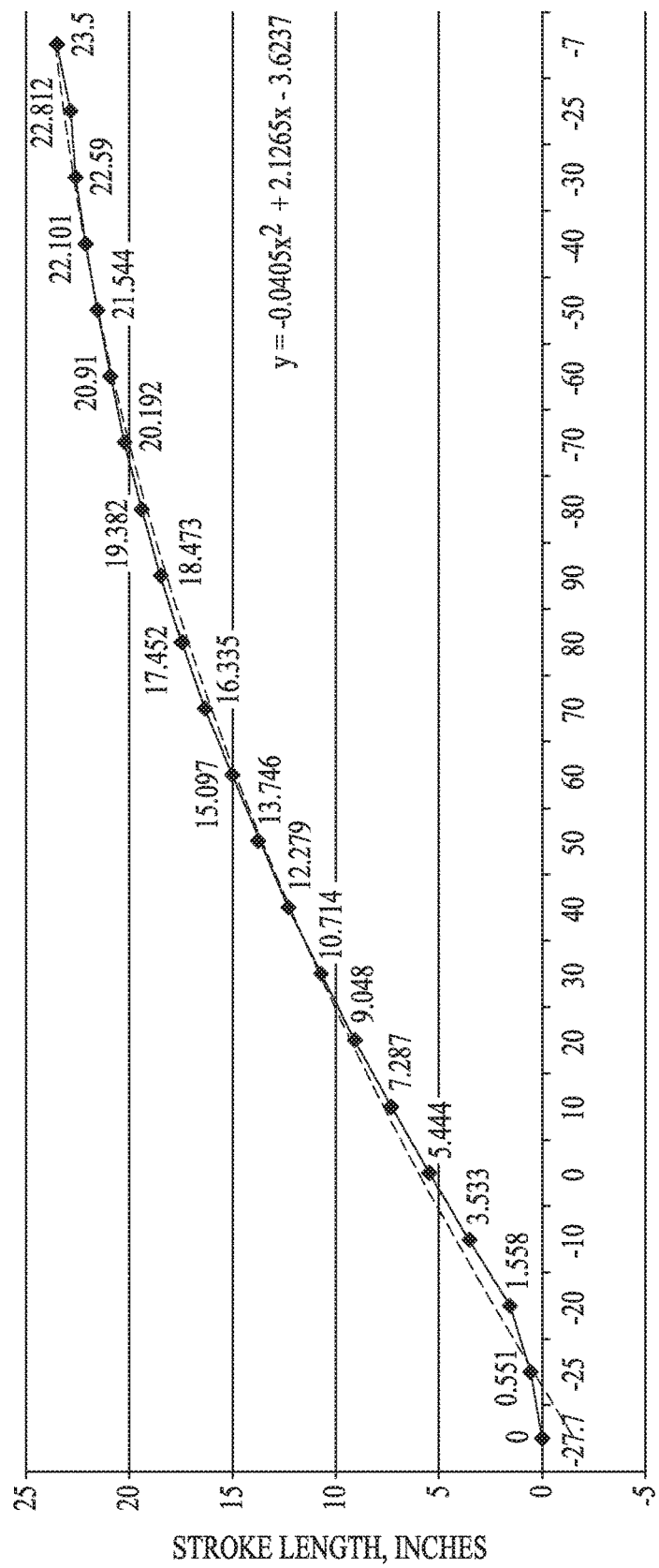
FIG. 27 is a graph of the rotational position of the steering assembly relative to the actuation position of the steering actuator.

FIG. 26 is a top plan view of the torsion ring 160 and FIG. 27 is a graph of the rotational position of the steering assembly relative to the actuation position of the steering actuator. With reference to FIG. 26, the torsion ring 160 includes a gauge 500 and indicator 510 shown on an enlarged scale, with the gauge 500 bearing scale markings from −30° to −20°. In FIG. 26, the indicator 510 is shown at −27.7° at zero stroke length (see FIG. 27), which would occur when the actuator is fully retracted. With reference to the graph on FIG. 27, when the actuator is fully extended, that is at an approximately 23.5 inch stroke length, the indicator 510 on the gauge 500 would be at −7° in the other direction, thus indicating that the steering assembly could provide a range for the steering angle somewhat in excess of 180° (for example 185°). It should be noted that both the −27.7° and the −7° may be extreme positions of the assembly if the actuator were allowed to fully retract or fully extend without limitation. However, it may be beneficial to establish a deadband at the ends of the stroke to avoid having the cylinder bottom out (particularly when fully extended), which could potentially bind up the mechanism. For example, in one embodiment, the deadband may be established between −27.7° and −25° on the extend portion of the cylinder stroke and between −7° and −25° coming back the other way on the retract portion. Accordingly, in this example, the controls would essentially limit the actual stroke performed to a range of 180° between −25° and −25° while keeping a cushion to aid in activating the rod of the cylinder. To provide for automatic operation control, the following equation (1) has been formulated to relate the actuator position y to the steering angle x:

$$y = -0.0405x^2 + 2.1265x - 3.6237 \quad (1)$$

Figure 28:
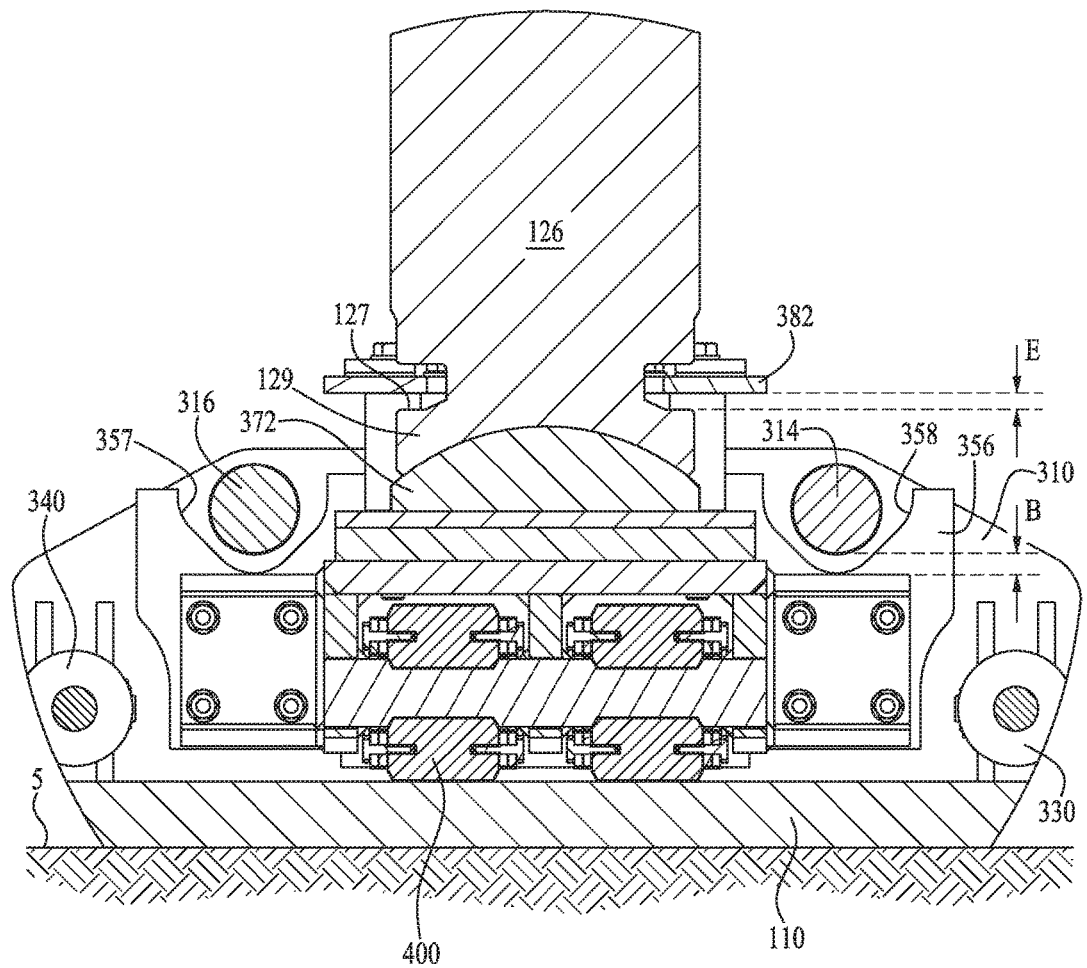
FIG. 28 is a partial cross-sectional view of the lifting device with the lift mechanism in the extended position.

Additional operating details of the load lifting mechanism are shown with respect to FIGS. 28-31. FIG. 28 illustrates the lifting piston 126 in the fully extended position, wherein the rolling assembly 400 is in contact with the foot pad 110 and the load/rig is supported/raised by the lift mechanism. In this position, there is a gap B between the rods 314, 316 (which are attached to the pad 110 via plates 310, 312) and the saddles 358, 357 in plate 356, as well as saddles in plate 350). Also in this position, the concave surface 129 of the piston cylinder 126 is in contact with the dome plate 372 of the lifting plates 370/380. There is also a gap E between the shoulder 127 of the lifting cylinder 126 and the lifting plate 382, the gap E allowing articulation of the foot with respect to the cylinder rod 126.

Figure 29:
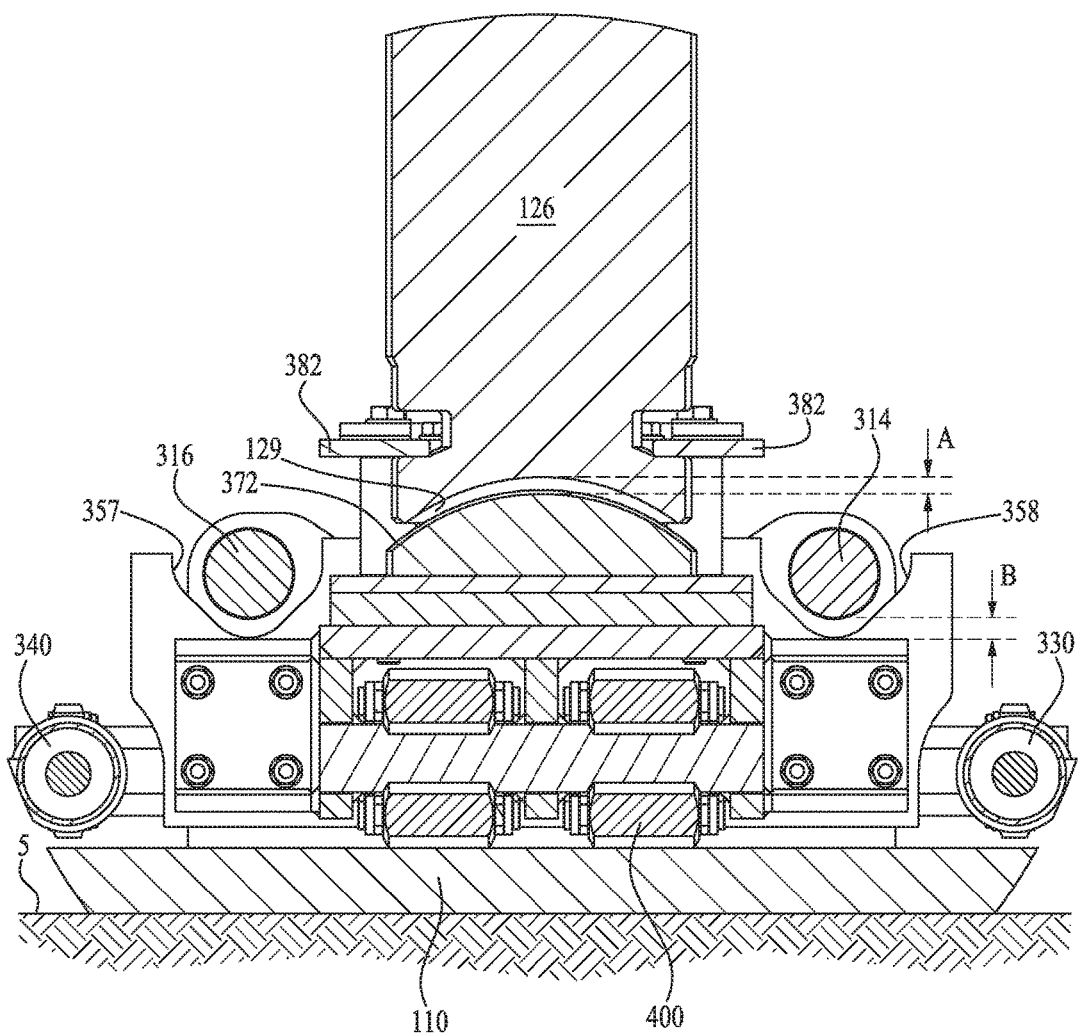
FIG. 29 is a partial cross-sectional view of the lifting device with the lift mechanism in a first retracted position, with the rolling mechanism still in contact with the pad.

FIG. 29 illustrates the lifting device with the lift mechanism in a first retracted position, with the rolling mechanism 400 still in contact with the pad 110, but the piston cylinder 126 (and the concave surface 129) is separated by a gap A from the dome plate 372 of the lifting plates 370/380, and the shoulder 127 of the piston cylinder 126 is contact with the lifting plate 382 and is ready to commence lifting the rolling mechanism. There remains the gap B between the rods 314/316 and the saddles 358, 356.

Figure 30:
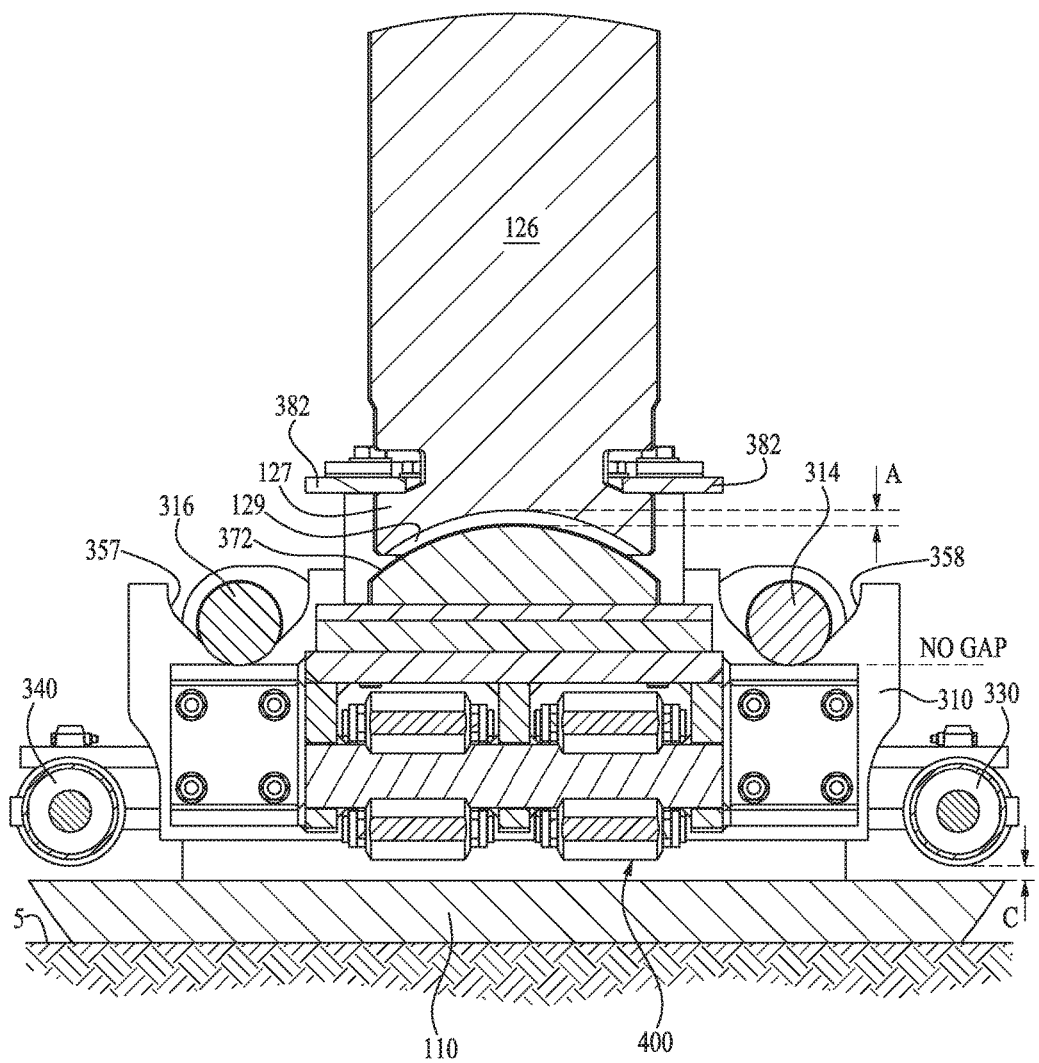
FIG. 30 is a partial cross-sectional view of the lifting device with the lift mechanism in a second retracted position, with the rolling mechanism lifted off the foot pad.

FIG. 30 illustrates the lifting device with the lift mechanism in a second retracted position, with the foot pad 110 still on the ground 5, and with the rolling mechanism 400 lifted off the foot pad 110 by a gap C. There is no gap between the rods 314/316 and the saddles 357, 356 and with the gap, the system is ready to commence lifting the entire foot assembly off the ground.

Figure 31:
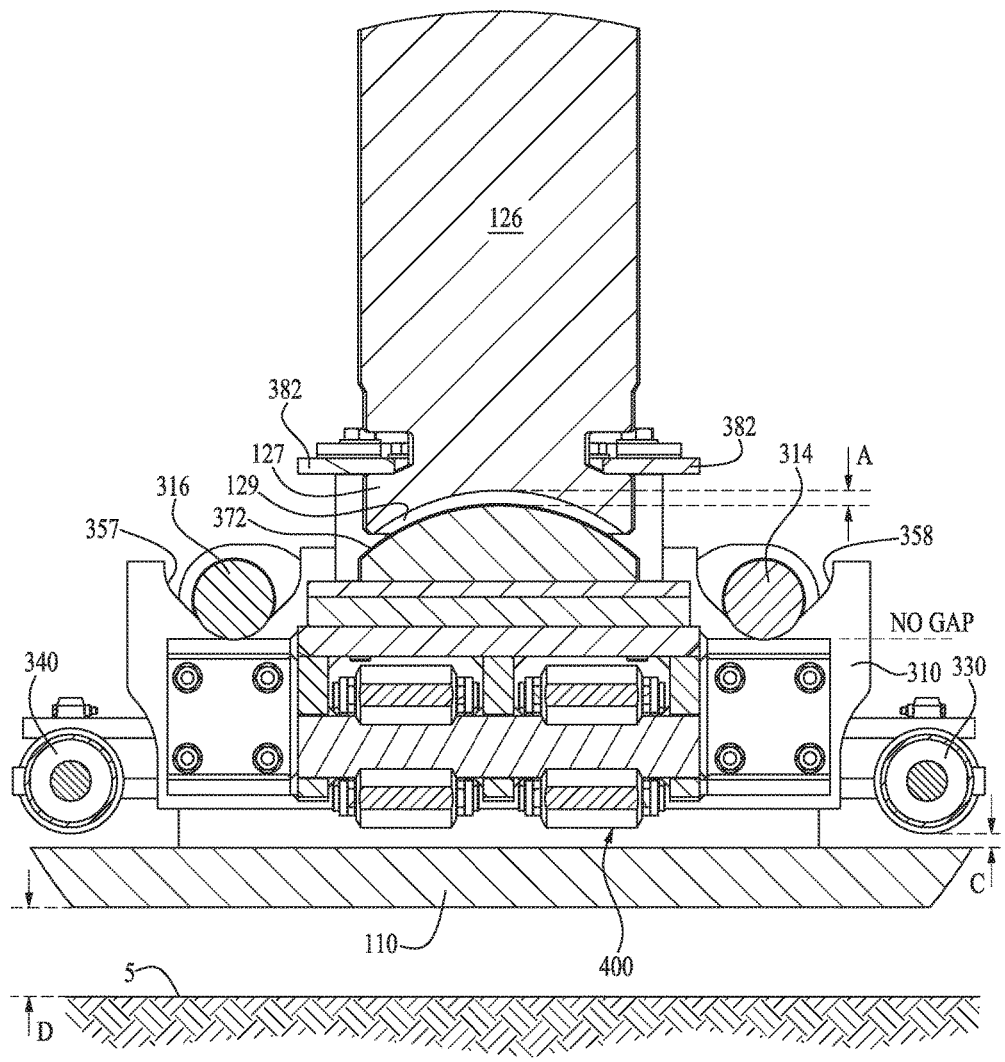
FIG. 31 is a partial cross-sectional view of the lifting device with the lift mechanism in a third retracted position, with the foot pad lifted off the ground.

FIG. 31 illustrates the lifting device with the lift mechanism in a third retracted position, with the foot pad lifted off the ground. With the rods 314, 316 engaged in the saddles 358, 357, the foot pad 110 is lifted off the ground as the piston cylinder 126 continues to retract creating a gap D between the pad 110 and the ground 5.

Figure 32:
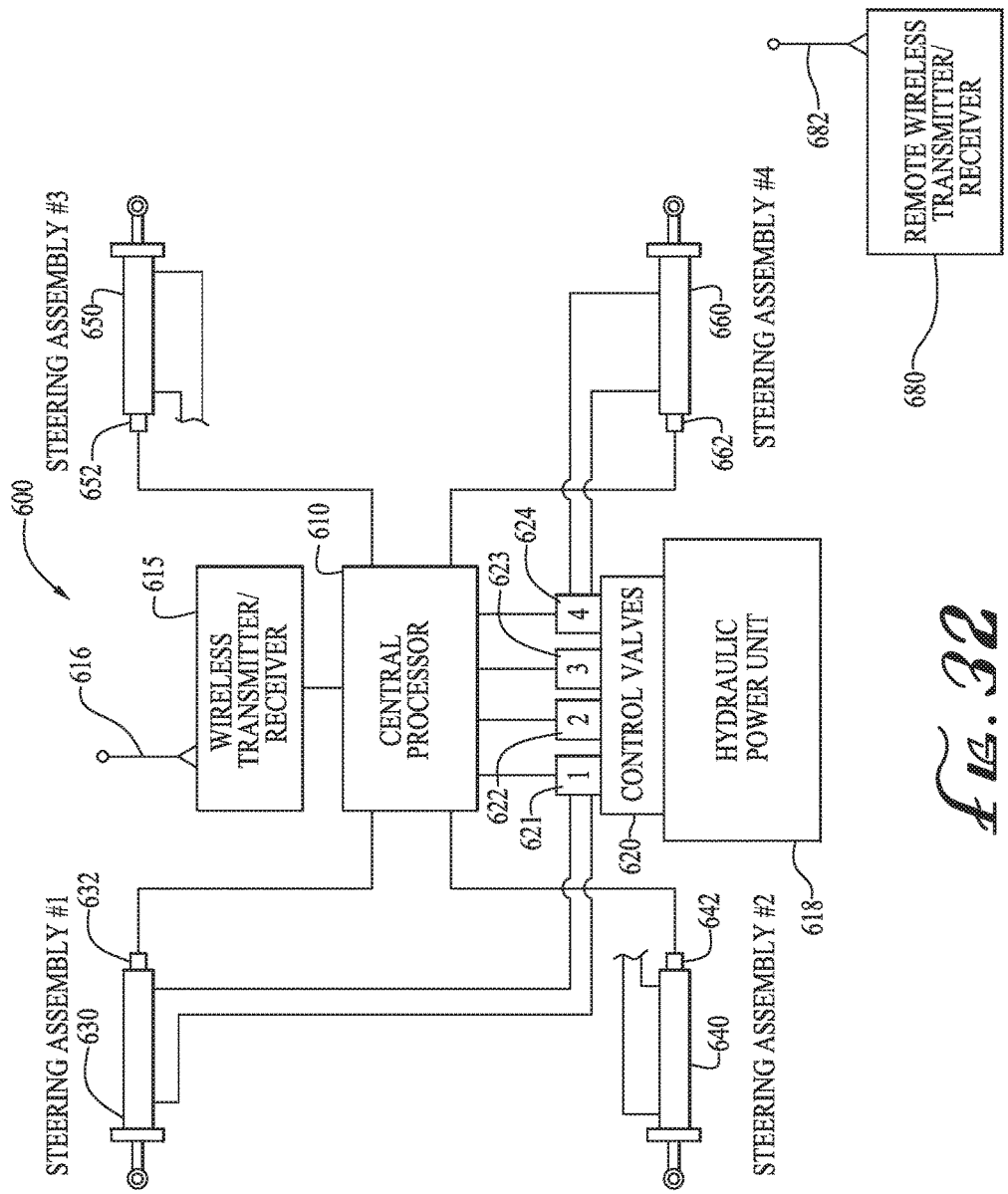
FIG. 32 is a schematic diagram of a control system according to an embodiment.

FIG. 32 is a diagram of a control system 600 according to an embodiment. The system controls four steering assemblies (#1, #2, #3 and #4). The system includes a hydraulic power unit 618 which provides hydraulic power to a control valve system 620 comprised of a plurality of control valves 621, 622, 623, 624. The operation of the control valves is controlled by a central processor 610 which receives control signals via a transmitter/receiver 615 from a remote transmitter/receiver 680. The connection may comprise a wired connection or may comprise a wireless connection via antenna 616 on the transmitter 615 and antenna 682 on the remote transmitter/receiver.

The first steering assembly includes a linear actuator 630 hydraulically connected to control valve 621, and a linear transducer 632 electrically connected to the central processor 610. The second steering assembly includes a linear actuator 640 hydraulically connected to control vave 622, and a linear transducer 642 electrically connected to the central processor 610. The third steering assembly includes a linear actuator 650 hydraulically connected to control valve 623, and a linear transducer 652 electrically connected to the central processor 610. The fourth steering assembly includes a linear actuator 660 hydraulically connected to control valve 624, and a linear transducer 662 electrically connected to the central processor 610. The displaced position of the respective linear actuator (630, 640, 650, 660) is detected by the respective linear transducer (632, 642, 652, 662) (or similar instrument for devices similar to hydraulic or pneumatic cylinders or by a rotary encoder for linear actuators with a hydraulic, pneumatic, or electrically driven motor).

The linear actuators may be controlled via a closed loop feedback system such as via a central processor 610 that monitors and adjusts the displaced position of each linear actuator. A program within or otherwise running the central processor 610, relates linear actuator displacement to rotational orientation of the roller/foot assembly.

The hydraulic linear actuators may be operated by directional control valves which receive their signals from the central processor via electricity (electric over hydraulic), compressed air (air over hydraulic), or hydraulic fluid (oil over hydraulic). Motor driven linear actuators 630, 640, 650, 660 may be controlled via the central processor 610 via electrical signals, compressed air or hydraulic power.

Figure 33:
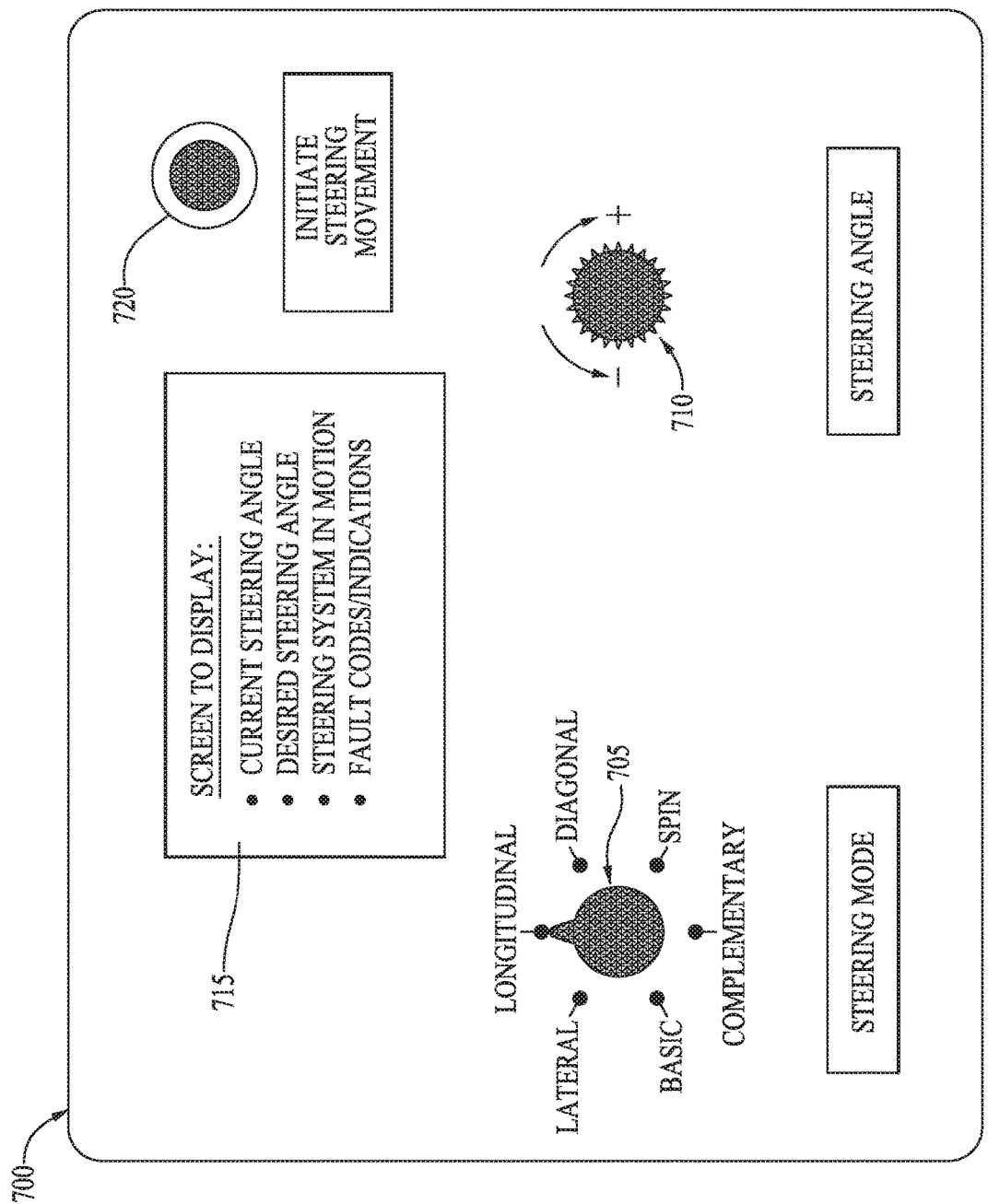
FIG. 33 is a diagram of the remote control of the control system of FIG. 32.

Operation of the steering functions and the walking system functions may be controlled through the central processor 610 by remote control 680. The remote control 680 may be connected to the central processor 610 via a wireless connection (and thus comprising a wireless remote control) or a wired connection (such as connected via a tether cable), or other suitable connection mechanism. FIG. 33 illustrates an interface 700 for the remote control 680. A closed loop feedback from the central processor 610 is displayed on the remote control display 715. Indicated feedback includes but is not limited to: steering angle set position, steering angle current position, steering system in motion, fault codes, and other suitable feedback.

Figure 34:
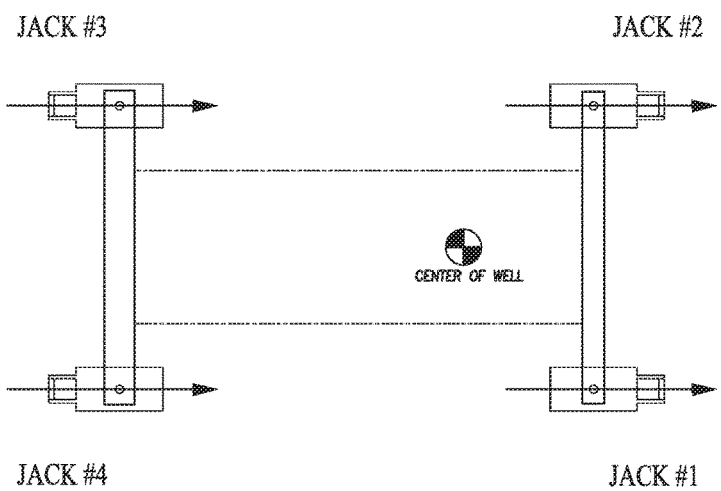
FIG. 34 is a diagram of settings for steering linkages for straight ahead travel mode.
Figure 35:
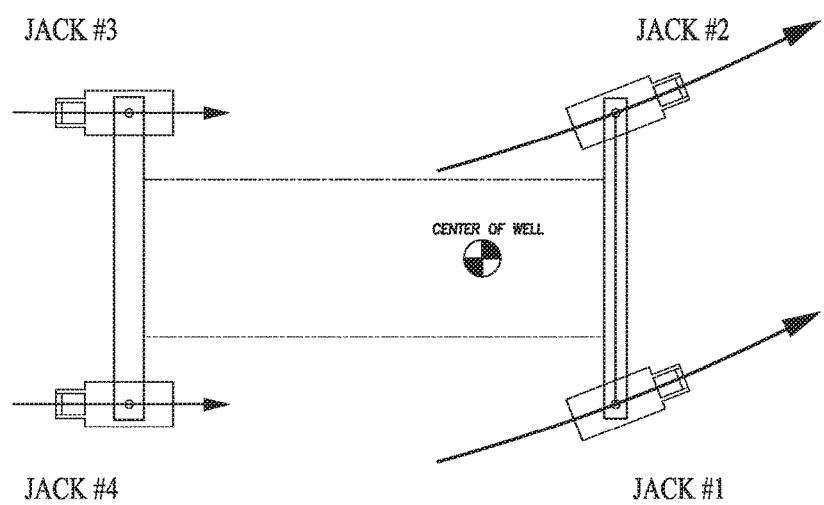
FIG. 35 is a diagram of settings for steering linkages for basic, simple steering travel mode.
Figure 30:
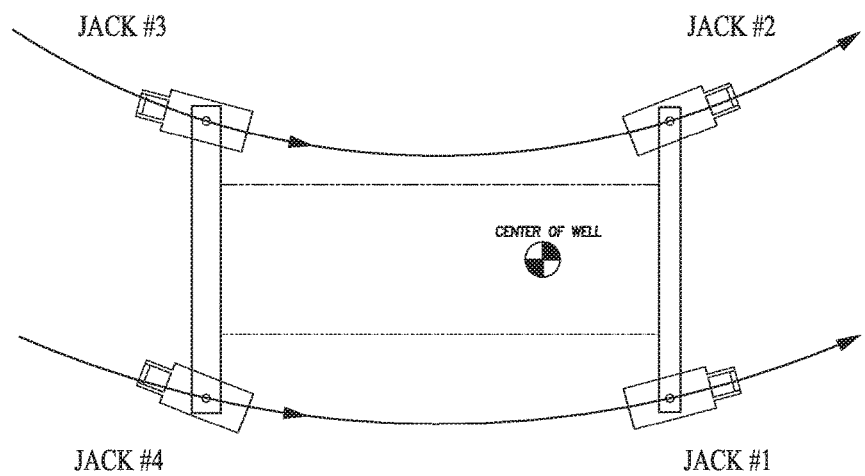
Figure 37:
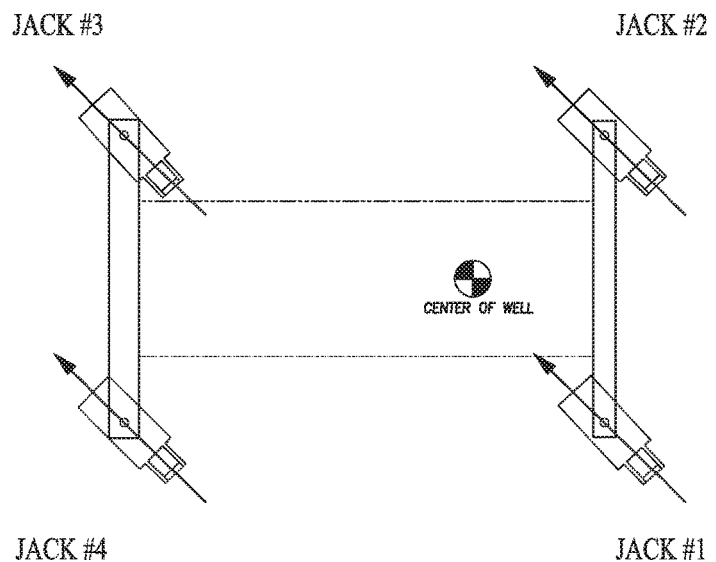
FIG. 37 is a diagram of settings for steering linkages for diagonal steering travel mode.

The remote interface may be provided with a plurality of factory preset standard steering modes which may be selected by selector switch 705. The operation of the standard steering modes are illustrated in FIGS. 34-39. The steering mode selection may set the orientations for aligning the walking system:

to move the load along the longitudinal axis of the structure (straight ahead, longitudinal travel mode as in FIG. 34). For straight ahead travel, the steering angles are set at 0° (all angles must be the same). In straight ahead travel, travel cylinders #1 and #2 retract while travel cylinders #3 and #4 extend.

to control any two adjacent jack assemblies, the effect would produce a basic or simple steering mode similar to that of an automobile (simple steering mode as in FIG. 35), the steering angle would be set by actuating the second switch 710. The steering angles of the lead lift/transport assemblies (Jack #1 and Jack #2) must match and are set in increments of 5° with a maximum of 15° (a steering angle of 15° is shown in FIG. 35) and the steering angles of the trailing lift/transport assemblies (Jack #3 and Jack #4) are set at 0°. In simple steering mode, travel cylinders #1 and #2 retract while travel cylinders #3 and #4 extend.

to control all four jack assemblies steering the front jack assemblies (Jack #1 and Jack #2) by an angle in a first direction and the rear jack assemblies (Jack #3 and Jack

Figure 38:
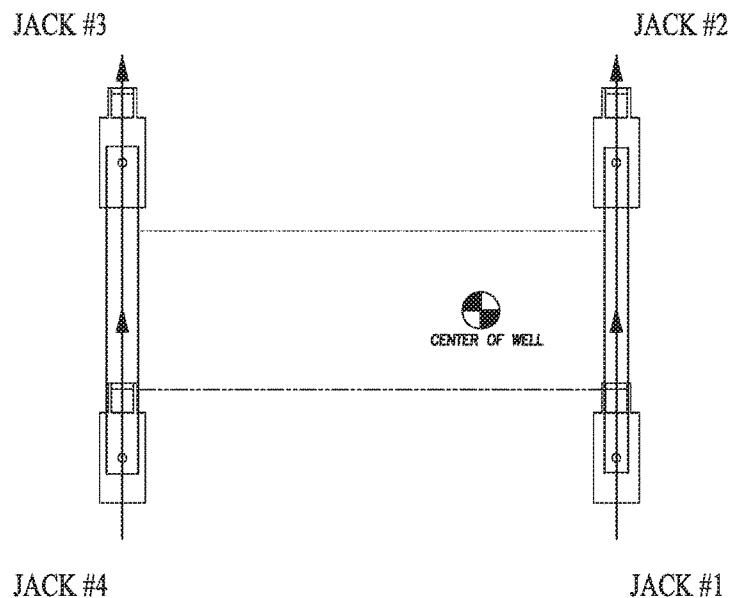
FIG. 38 is a diagram of settings for steering linkages for lateral steering travel mode.
Figure 39:
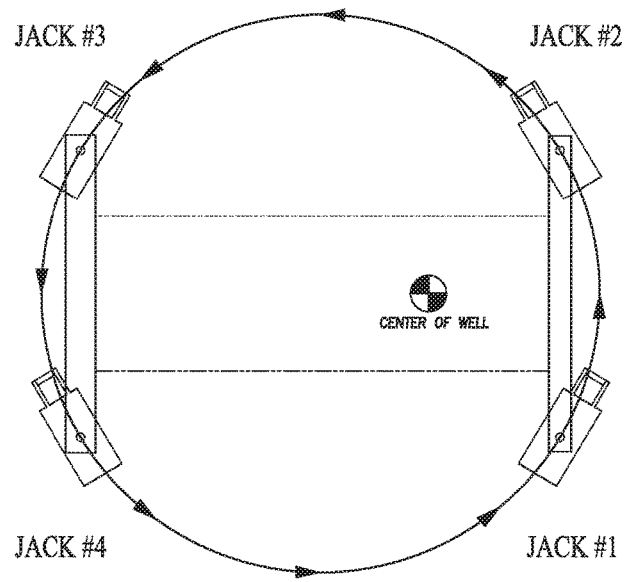
FIG. 39 is a diagram of settings for steering linkages for spin steering travel mode.

4) at the same angle in the opposite direction (complementary steering mode as in FIG. 36), the steering angle would be set by actuating the second switch 710. The steering angles of all the lift/transport assemblies must match, and are set in increments of 5° with a maximum of 15° (a steering angle of 15° is shown in FIG. 36). In complementary steering mode, travel cylinders #1 and #2 retract while travel cylinders #3 and #4 extend.

to move the load diagonally in any direction (diagonal travel steering mode as in FIG. 37), the steering angle would be set by actuating the second switch 710. It is noted that the steering angle numbers do not match for some directions. In diagonal steering mode, all travel cylinders retract together and extend together.

to move the load along the lateral axis (lateral travel, lateral steering mode as in FIG. 38). In lateral steering mode, all travel cylinders retract together and extend together.

to spin the load about a central vertical axis of the structure (spin steering mode as in FIG. 39), the steering angle would be set by actuating the second switch 710. FIG. 39 illustrates the steering plates in a circular steering position. In circular/spin steering mode the some jack assemblies may need to retract while others extend. The steering angle for spin mode is based on the geometry of each individual load/rig and therefore varies with each load/rig. The angle is one of the design outputs for each walking system application. The steering angle will be input into the Central Processor 610 during its initial setup and will be unique to that load/rig. By way of example, the steering angle positions shown in FIG. 39 are set at Jack #1 70°; Jack #2 110°, Jack #3 110°; and Jack #4 70°.

The selector switch 705 selects the appropriate preset direction. For example, when switched to diagonal mode, the second switch 710 is operated to define the desired angle of travel. Other preset modes are achievable. Another example steering mode would control two separate sets of two adjacent jack assemblies. Each set of two would turn in the opposite direction of the other set. The steering effect would be similar to the steering method of an articulated loader.

FIG. 40 is a flow diagram of an example operating process 900 for the central processor 610 of FIG. 32, comprising the following steps.

Step 902—receiving steering mode input from the remote control 680.

Step 904—upon receiving input (from Input Source 910) from steering actuators (via signals from the linear transducers 632, 642, 652, 662), determining whether all steering actuators are in the correct position with respect to desired orientation. If Yes proceed to Step 920, if No proceed to Step 906.

Step 906—push the "Initiate Steering Movement" button 720 on remote control 680 to actuate steering repositioning. Proceed to Step 908.

Step 908—upon receiving input (from Input Source 910) from steering actuators (via signals from the linear transducers 632, 642, 652, 662), determining whether all steering actuators 630, 640, 650, 660 are in the correct position with respect to desired orientation. If Yes proceed to Step 920, if No proceed to Step 912.

Step 920—activating "System Ready" illumination on the display 715 of the interface 700 of the remote control 680. Then proceed to Step 922.

Step 922—system is ready to perform walking functions.

Step 912—determining if attempt to move duration exceeds time limit. If No, return to Step 908, if Yes, proceed to Step 914. The time limit is an amount (e.g., about one minute) that will provide the actuators adequate time to be moved to the desired orientation(s).

Step 914—activate fault light on the remote control 680, list the fault codes/indications on the display screen 715. Proceed to Step 916.

Step 916—Manually diagnose and attempt to resolve the fault issue.

Other embodiments are envisioned. Although the description above contains certain specific details, these details should not be construed as limiting the scope of the invention, but as merely providing illustrations of some embodiments/examples. It should be understood that subject matter disclosed in one portion herein can be combined with the subject matter of one or more of other portions herein as long as such combinations are not mutually exclusive or inoperable.

The terms and descriptions used herein are set forth by way of illustration only and not meant as limitations. It will be obvious to those having skill in the art that many changes may be made to the details of the above-described embodiments without departing from the underlying principles of the invention.

The invention claimed is:

1. A load transportation system configured to move a load over a surface in one or more incremental steps via a plurality of lift/transport assemblies, each lift/transport assembly comprising
    a lift mechanism operative to lift a load-bearing frame supporting the load;
    a rolling assembly, including a foot pad for contacting the surface, the rolling assembly coupled to the lift mechanism;
    a steering assembly coupled between the lift mechanism and the rolling assembly and operative to rotate the rolling assembly, the steering assembly comprising
        a steering ring connected to the rolling assembly and operative when rotated to rotate with the rolling assembly,
        a linear actuator,
        first linkage comprising a first linkage first end and a first linkage second end, wherein the first linkage first end is rotationally connected to the linear actuator,
        a second linkage comprising a second linkage first end and a second linkage second end, wherein the second linkage first end is rotationally connected to the first linkage second end and at the second linkage second end is rotationally connected to the steering ring,
    wherein the first and second linkages are operative to continuously rotate the steering ring over an angle of at least about 179° upon motion of the linear actuator.

2. A system according to claim 1 wherein the linear actuator comprises a hydraulic cylinder drive system.

3. A system according to claim 1 wherein the linear actuator is selected from the group consisting of: a hydraulic linear drive system, a screw drive, a rack and pinion drive.

4. A system according to claim 1 wherein the linear actuator is powered hydraulically, pneumatically or electrically.

5. A system according to claim 1 wherein the first linkage comprises a first curved body section, and the second linkage comprises a second curved body section.

6. A system according to claim 1 wherein the linear actuator is controlled via a closed loop feedback system comprising a central processor that monitors the displaced position of the linear actuator and adjusts displaced position of the linear actuator operative for engaging the first and second linkages for rotating the steering ring over a given angle thereby adjusting rotational orientation of the rolling assembly.

7. A system according to claim 6 wherein the linear actuator comprises a linear transducer operative for providing a signal to the central processor of a displaced position of the linear actuator.

8. A system according to claim 6 further comprising a remote controller operative for providing control input to the central processor and a wireless connection between the remote controller and the central processor.

9. A load transportation system according to claim 1 wherein the first and second linkages are operative to continuously rotate the steering ring over an angle of at least about 179° while maintaining connections between the first linkage and the second linkages, between the linear actuator and the first linkage, and between the second linkage and the steering ring.

10. A load transportation system according to claim 1 wherein the steering ring is rotated over an angle of at least about 179° upon motion of a single stroke of the linear actuator.

11. A load transportation system according to claim 1 wherein the first and second linkages are operative to continuously rotate the steering ring over an angle of at least about 179° without disconnection of any components of the steering assembly.

12. A method for steering a load transportation system configured to move a load over a surface in one or more incremental steps via a plurality of lift/transport assemblies, each lift/transport assembly comprising a lift mechanism operative to lift a load-bearing frame supporting the load, a rolling assembly, including a foot pad for contacting the surface, the rolling assembly rotatably coupled to the lift mechanism;
rotating the rolling assembly relative to the lift mechanism via a steering assembly coupled between the lift mechanism and the rolling assembly, the steering assembly comprising a steering ring connected to the rolling assembly and operative when rotated to rotate with the rolling assembly, a linear actuator, a first linkage comprising a first linkage first end and a first linkage second end, wherein the first linkage first end is rotationally connected to the linear actuator, a second linkage comprising a second linkage first end and a second linkage second end, wherein the second linkage first end is rotationally connected to the first linkage second end and the second linkage second end is rotationally connected to the steering ring,
operating the linear actuator wherein the first and second linkages are operative to rotate the steering ring over an angle of at least about 179° upon motion of the linear actuator.

13. A method according to claim 12 wherein the first linkage comprises a first curved body section, and the second linkage comprises a second curved body section.

14. A method according to claim 12 further comprising maintaining connections between the first linkage and the second linkages, between the linear actuator and the first linkage, and between the second linkage and the steering ring while continuously rotating the steering ring over an angle of at least about 179°.

15. A method according to claim 12 wherein the steering ring is rotated over an angle of at least about 179° upon motion of a single stroke of the linear actuator.

16. A method according to claim 12 wherein the first and second linkages are operative to continuously rotate the steering ring over an angle of at least about 179° without disconnecting any components of the steering assembly.

17. A load transportation system configured to move a load over a surface in one or more incremental steps via a plurality of lift/transport assemblies, each lift/transport assembly comprising
a lift mechanism operative to lift a load-bearing frame supporting the load;
a rolling assembly, including a foot pad for contacting the surface, the rolling assembly coupled to the lift mechanism;
a steering assembly coupled between the lift mechanism and the rolling assembly and operative to rotate the rolling assembly, the steering assembly comprising
a steering ring connected to the rolling assembly and operative when rotated to rotate with the rolling assembly,
a linear actuator,
a multi-linkage connector having a first end and a second end, wherein the first end is rotationally connected to the linear actuator and the second end is rotationally connected to the steering ring,
wherein the multi-linkage connector is operative to continuously rotate the steering ring over an angle of at least about 179° upon motion of the linear actuator while maintaining connections of the multi-linkage connector to the linear actuator and the steering ring.

18. A load transportation system according to claim 17 wherein the multi-linkage connector is operative to continuously rotate the steering ring over an angle of at least about 179° without disconnection of any components of the steering assembly.

19. A load transportation system according to claim 17 wherein the multi-linkage connector is operative to continuously rotate the steering ring over an angle of at least about 179° while maintaining connections between linkages of the multi-linkage connector, between the multi-linkage connector and the linear actuator, and between the multi-linkage connector and the steering ring.

20. A load transportation system according to claim 17 wherein the steering ring is rotated over an angle of at least about 179° upon motion of a single stroke of the linear actuator.

21. A load transportation system configured to move a load over a surface in one or more incremental steps via a plurality of lift/transport assemblies, each lift/transport assembly comprising
a lift mechanism operative to lift a load-bearing frame supporting the load;
a rolling assembly, including a foot pad for contacting the surface, the rolling assembly coupled to the lift mechanism;
a steering assembly coupled between the lift mechanism and the rolling assembly and operative to rotate the rolling assembly, the steering assembly comprising
a steering ring connected to the rolling assembly and operative when rotated to rotate with the rolling assembly,
a linear actuator,
first linkage comprising a first linkage first end and a first linkage second end, wherein the first linkage first end is connected to the linear actuator, a second linkage comprising a second linkage first end and a second linkage second end, wherein the second linkage first end is connected to the first linkage second end and the second linkage second end is connected to the steering ring, wherein the first and second linkages are operative upon displacement of the linear actuator to continuously rotate the steering ring over an angle of at least about 179° without requiring disconnection of a linkage and without requiring reconfiguration of the steering assembly.

22. A load transportation system according to claim 21 wherein the steering ring is rotated over an angle of at least about 179° upon motion of a single stroke of the linear actuator.

23. A load transportation system configured to move a load over a surface in one or more incremental steps via a plurality of lift/transport assemblies, each lift/transport assembly comprising a lift mechanism operative to lift a load-bearing frame supporting the load;

a rolling assembly, including a foot pad for contacting the surface, the rolling assembly coupled to the lift mechanism;

a steering assembly coupled between the lift mechanism and the rolling assembly and operative to rotate the rolling assembly, the steering assembly comprising a steering ring connected to the rolling assembly and operative when rotated to rotate with the rolling assembly, a linear actuator, first linkage connected to the linear actuator, a second linkage comprising a second linkage first end and a second linkage second end, wherein the second linkage first end is connected to the first linkage second end and the second linkage second end is connected to the steering ring, wherein the first and second linkages are operative, upon displacement of the linear actuator, to continuously rotate the steering ring over an angle of at least about 179° while maintaining connections between the first linkage and the second linkages, between the linear actuator and the first linkage, and between the second linkage and the steering ring.

24. A load transportation system according to claim 23 wherein the steering ring is rotated over an angle of at least about 179° upon motion of a single stroke of the linear actuator.

* * * * *